(12) United States Patent
Ohshima et al.

(10) Patent No.: US 7,295,221 B2
(45) Date of Patent: Nov. 13, 2007

(54) IMAGE PROCESSING APPARATUS AND METHOD, AND COMPUTER-READABLE MEMORY

(75) Inventors: Hideaki Ohshima, Machida (JP); Kazushige Hatori, Urawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/176,274

(22) Filed: Oct. 21, 1998

(65) Prior Publication Data

US 2003/0058260 A1    Mar. 27, 2003

(30) Foreign Application Priority Data

Oct. 23, 1997  (JP)  ................... 9-291353
Oct. 23, 1997  (JP)  ................... 9-291354

(51) Int. Cl.
*G09G 5/00* (2006.01)
*G06T 3/40* (2006.01)

(52) U.S. Cl. .................................. 345/666
(58) Field of Classification Search ............. 345/800, 345/801, 660, 666
See application file for complete search history.

(56) References Cited

U.S. PATENT DOCUMENTS

| | | | |
|---|---|---|---|
| 5,682,487 A * | 10/1997 | Thomson | |
| 5,684,969 A * | 11/1997 | Ishida | |
| 5,815,151 A * | 9/1998 | Argiolas | |
| 5,870,090 A * | 2/1999 | Takai et al. | |
| 5,903,265 A * | 5/1999 | Bogdan | |
| 5,977,966 A * | 11/1999 | Bogdan | |
| 6,124,841 A * | 9/2000 | Aoyama | 345/660 |

FOREIGN PATENT DOCUMENTS

| | | |
|---|---|---|
| EP | 0466154 A2 * | 1/1992 |
| JP | 1-130261 | 5/1989 |
| JP | 3-71191 | 3/1991 |
| JP | 4-51189 | 2/1992 |
| JP | 5-81399 | 4/1993 |
| JP | 7-105407 | 4/1995 |
| JP | 7-200866 | 8/1995 |
| JP | 8-16803 | 1/1996 |
| JP | 8-263633 | 10/1996 |
| JP | 8-287050 | 11/1996 |

OTHER PUBLICATIONS

Jame D. Foley et al., Computer Graphics Principles and Practice, Jul. 1997, Addison_Wesley Publishing Company, pp. 1050-1051.*

* cited by examiner

*Primary Examiner*—Jeffery A Brier
(74) *Attorney, Agent, or Firm*—Fitzpatrick, Cella, Harper & Scinto

(57) ABSTRACT

An apparatus has a holding means for holding output images in a first size and their output positions, and output images in a second size and their output positions, and determines an output image and rendering position corresponding to the output size of the output image calculated based on the ratio of change in output position of the output image between the first and second sizes upon designation of the output size of the output image, thus rendering an image.

23 Claims, 18 Drawing Sheets

IMAGE PROCESSING APPARATUS AND METHOD, AND COMPUTER-READABLE MEMORY

BACKGROUND OF THE INVENTION

The present invention relates to an image processing apparatus and method, which can attain variable magnification processing of output information and, for example, to an image processing apparatus and method, which can effectively edit upon rendering a character box or a frame that bounds a figure or image, or upon rendering a grouped figure.

In a document creation apparatus or image system having a function of displaying a figure and image together with a document, when the size of a character box, a frame that bounds a figure or image, or a grouped figure is to be changed, the figure changes in proportion to the size change ratio after the size has changed.

For example, when the magnification is doubled, the frame width also becomes twice. That is, when the frame width is 1 cm when the magnification=1×, it becomes 2 cm when the magnification=2×.

FIG. 18 shows an example of rendering by this conventional variable magnification processing. For example, when an upper frame 90 is enlarged, the frame size, width, and the like also become bolder at that ratio, as indicated by a lower frame in FIG. 18.

In this way, in the conventional apparatus, when the size of a character box, a frame that bounds a figure or image, or a grouped figure is to be changed, it shows a proportional change corresponding to the size change ratio. As a result, the frame or grouped figure is far from its original purpose, resulting in an unnatural image.

Furthermore, when character information is fitted in the frame, not only the size of the character itself may enlarge but also the number of characters stored in the frame may change by the variable magnification instruction of the frame.

However, in such case, in the conventional apparatus, after the frame and character information are temporarily separated, input/edit processing for, e.g., increasing/decreasing the number of characters must be made, and the layout of the character information must be changed. Then, the character information must be fitted in the frame, resulting in cumbersome operations.

Moreover, since the character information is edited independently of the frame, the combined character information and frame may become different from that the user expected. In such case, the user must edit them from the beginning, and it is very hard to change the layout.

SUMMARY OF THE INVENTION

The present invention has been made to solve the above-mentioned problems, and has as its object to provide an image processing apparatus and method, which handles a character box, a frame that bounds a figure and image, and a grouped figure as an object set, can naturally render the object set in correspondence with a purpose assigned to the frame or grouped figure upon changing the size of the object set, and can process the object set structured by objects, and a computer-readable memory.

It is another object of the present invention to provide an image processing apparatus and method, which can easily change, e.g., the layout of character information while confirming balance with a frame, when the character information is fitted in the frame, and a computer-readable memory.

As means for solving the above-mentioned objects, the present invention comprises, e.g., the following arrangement.

That is, an image processing apparatus capable of variable magnification processing of output information, is characterized by comprising holding means for holding output images in a first size and output positions thereof, and holding output images in a second size and output positions thereof, selection means for selecting a desired image from the output images held by the holding means, and designating an output size of the selected image, generation means for generating an output image corresponding to the output size on the basis of a ratio of change in output image between the first and second sizes held by the holding means of the image selected by the selection means, determination means for determining a rendering position of the output image corresponding to the output size on the basis of a ratio of change in output position between the first and second sizes held by the holding means of the image selected by the selection means, and rendering means for rendering the output image generated by the generation means at the rendering position determined by the determination means.

For example, the selection means selects the image from the output images in the first size held by the holding means. Alternatively, the rendering means renders the output image generated by the generation means on a display screen of a display device.

For example, the apparatus further comprises output means for outputting rendering information of the rendering means to an output device which permanently visually displays the rendering information in units of pages. Alternatively, the rendering means renders the output image generated by the generation means as print information to a printing apparatus.

For example, the output image rendered by the rendering means is frame information of image information, and the apparatus further comprises designation means for designating fitting information to be fitted in the frame information, and fitting means for fitting the fitting information designated by the designation means into a frame of the frame information. Alternatively, after fitting by the fitting means, a rendering magnification of the frame information of the image selected by the selection means is allowed to change, and when the rendering magnification of the frame information is changed after fitting, a fitting position of the fitting information is changed in proportion to movement of the rendering position determined by the determination means to hold a fitting positional relationship with the frame information.

For example, when the fitting information designated by the designation means is image information, the fitting means does not change the fitting information irrespective of the change in size of the frame information of the image selected by the selection means, and renders an image in the fitting information, which corresponds to an interior of a frame of the frame information, as the fitting information in the frame. Alternatively, when the fitting information designated by the designation means is character information, the fitting means displays the character information within a frame of the frame information of the image selected by the selection means.

For example, when a size of the character information in a row direction falls outside the frame, the fitting means fits the character information by automatically inserting a carriage return so as to make the character information fall within the frame.

For example, a moving amount of a rendering position of the output image corresponding to the ratio of change in output position of the output image between the first and second sizes is compressed in the vicinity of an edge portion of an outputtable range so as to prevent the rendering position from falling outside the outputtable range of an output device upon movement of the rendering position determined by the determination means for the output image selected by the selection means.

An image processing apparatus for rendering an object set generated by document processing means for processing a character and figure or image processing means for processing an image, the object set being formed by more than one objects, each object having an attribute for rendering which is associated with a mapping method upon changing a size of the object, and can be individually set, is characterized by comprising edit means for editing the objects that form the object set, rendering means for rendering based on attributes in units of objects, changing means for changing a size of the object set, generation means for generating new size information of the object set in correspondence with the change in size by the changing means, and determination means for determining a new rendering attribute of each object on the basis of the rendering attribute of each of the objects that form the object set in accordance with the size information generated by the generation means, the rendering means rendering on the basis of the rendering attributes of the objects determined by the determination means.

For example, the edit means can edit a character or character string as an edit function of the objects that form the object set. Alternatively, the edit means can edit a figure as an edit function of the objects that form the object set.

As means for solving the above-mentioned objects, the present invention comprises, e.g., the following arrangement.

That is, an image processing apparatus capable of variable magnification processing of output information, is characterized by comprising instruction means for instructing simultaneous variable magnification processing of a specific region, and changing means for changing a layout without changing a size of a character itself in the specific region when the instruction means instructs the variable magnification processing of the specific region in one of the vertical and horizontal directions, and changing the size of the character itself without changing the layout when the instruction means instructs the variable magnification processing of the specific region in both the vertical and horizontal directions.

For example, the changing means changes the layout by changing the number of lines and the number of characters of character information. Alternatively, when the instruction means instructs the variable magnification processing of the specific region in one of the vertical and horizontal directions, the changing means does not change a size of an image in the specific region.

For example, the specific region, the variable magnification processing of which is instructed by the instruction means, is a region in a frame including a fitted region, which is registered in advance. Also, the changing means comprises holding means for holding an output image of the frame in a first size and an output position of the output image in the first size, and an output image of the frame in a second size and an output position of the output image in the second size, and generation means for generating a size-changed frame image corresponding to an instructed magnification factor on the basis of a ratio of change in output image between the first and second sizes held by the holding means of a size-changed image of the frame instructed by the instruction means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 17A to 17C show the frame variable magnification processing results by the processing shown in FIG. 16.

DESCRIPTION OF THE PREFERRED EMBODIMENTS

An embodiment according to the present invention will be described in detail hereinafter with reference to the accompanying drawings. In the following description, the embodiment of the present invention is applied to a rendering system of an object set structured by objects.

Figure 1:
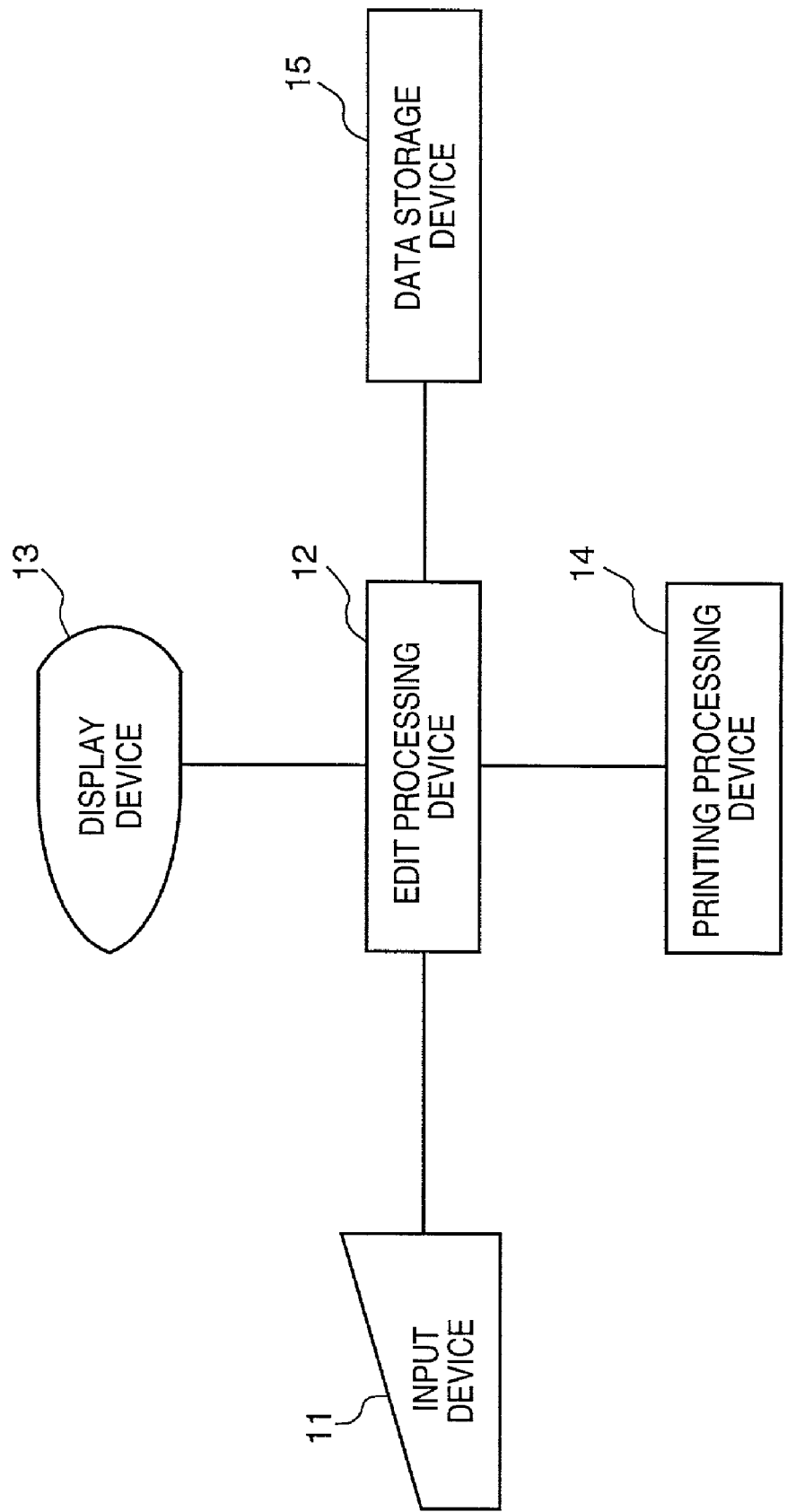
FIG. 1 is a schematic block diagram showing the overall arrangement according to an embodiment of the present invention.

FIG. 1 is a schematic block diagram showing the overall arrangement according to the embodiment of the present invention. Referring to FIG. 1, reference numeral 11 denotes an input device such as a keyboard, mouse, and the like for inputting characters, frame size, and the like. The input device 11 may also comprise an image input unit for inputting image information and the like. As the image input unit, arbitrary input devices such as a disk device which can read a magnetic disk that stores image information, a reader which reads an original image, and the like may be used. Also, a device that receives an image or document information from another information processing apparatus via a communication medium may be used.

Reference numeral 12 denotes an edit processor (central processing unit) in a document creation apparatus or image system for rendering an object set; 13, a display device such as a display; 14, a printing apparatus such as a printer; and 15, a data storage device storing object data and the like.

In the above arrangement, the edit processor 12 handles image information, character information, frame information, and the like input from the input device 11 as objects, registers these objects in, e.g., the data storage device 15, renders and displays them as a structured object set on the display screen of the display device 13, and prints them out from the printing apparatus 14.

The edit processor 12 can freely change the display or print sizes of objects stored in the data storage device 15 or displayed on the display device 13 in accordance with instruction inputs from the input device 11. The size change process will be explained in detail later.

Figure 2:
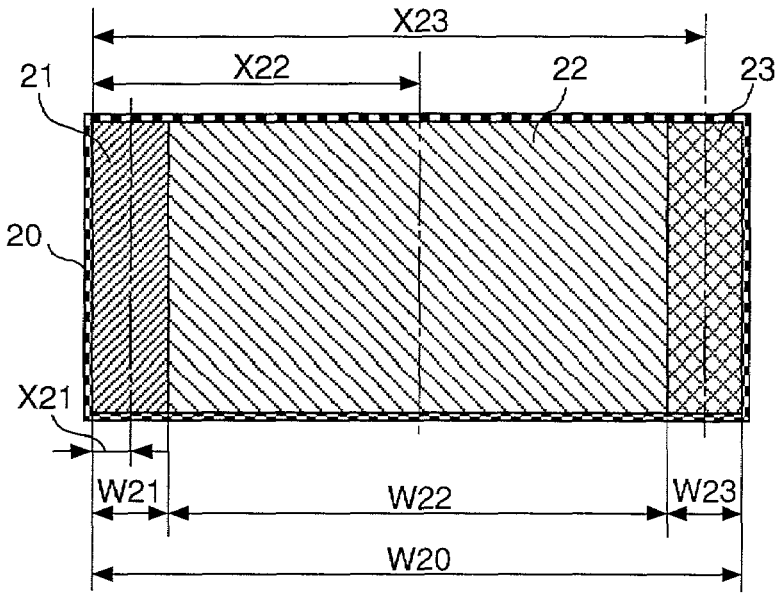
FIG. 2 shows an example of a window defined by four objects as an example of an object set in the embodiment of the present invention.
Figure 2:
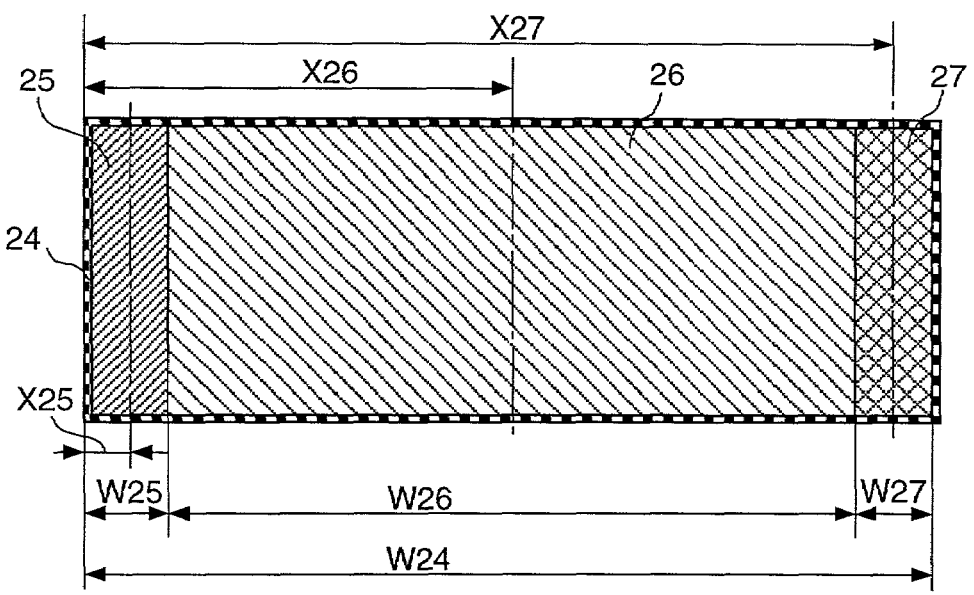

FIG. 2 shows an example of a window defined by four objects as an example of object set in the embodiment of the present invention. The example shown in FIG. 2 indicates the display states rendered on the display device 13 before and after the size in only the horizontal direction (x-axis direction) has changed. The upper window indicates the state before the size change, and the lower window indicates the state after the size change (enlargement).

Note that the window position after the size has changed is intentionally moved downward in FIG. 2 for the sake of easy understanding, but the reference position of the window displayed on the display device 13 remains the same.

Referring to FIG. 2, reference numeral 20 denotes an object as an outer frame window before the size change; W20, the width of the outer frame window 20; 21, a left object as one object that forms the outer frame window 20; X21, the coordinate position of the object 21 from the left end as one rendering attribute of the object 21; and W21, the width of the object 21 as another rendering attribute of the object 21.

Reference numeral 22 denotes a middle object as one object that forms the outer frame window 20; X22, the coordinate position of the object 22 from the left end as one rendering attribute of the object 22; and W22, the width of the object 22 as another rendering attribute of the object 22.

Reference numeral 23 denotes a right object as one object that forms the outer frame window 20; X23, the coordinate position of the object 23 from the left end as one rendering attribute of the object 23; and W23, the width of the object 23 as another rendering attribute of the object 23.

Reference numeral 24 denotes an object as an outer frame window after the size change; W24, the width of the outer frame window 24 after the size change; 25, a left object as one object that forms the outer frame window after the size change; X25, the coordinate position of the object 25 from the left end as one rendering attribute of the object 24; and W25, the width of the object 25 as another rendering attribute of the object 25 after the size change.

Reference numeral 26 denotes a middle object as one object that forms the outer frame window 24 after the size change; X26, the coordinate position of the object 26 from the left end as one rendering attribute of the object 26; and W26, the width of the object 26 as another rendering attribute of the object 26.

Reference numeral 27 denotes a right object as one object that forms the outer frame window 24 after the size change; X27, the coordinate position of the object 27 from the left end as one rendering attribute of the object 27; and W27, the width of the object 27 as another rendering attribute of the object 27.

Figure 3:
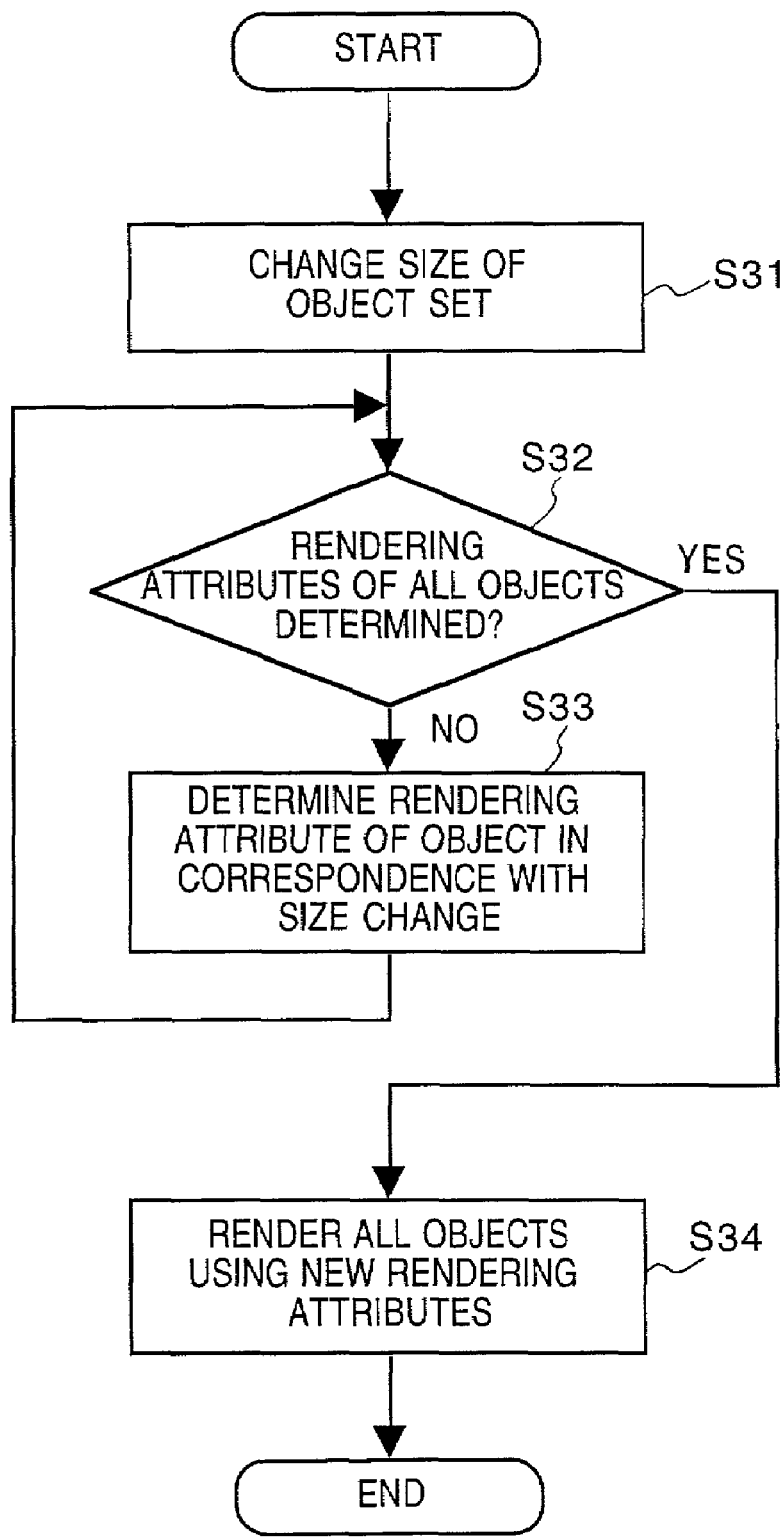
FIG. 3 is a control flow chart of an edit processor in the processing shown in FIG. 2.

FIG. 3 shows an example of the control flow chart of the edit processor 12 in the processing shown in FIG. 2. The object size change processing in this embodiment will be explained below with reference to FIGS. 2 and 3. The following explanation will be given along the flow of the processing shown in FIG. 3.

An object to be processed is displayed on the display screen of the display device 13. For example, the frame shown in FIG. 2 is selected by the input device 11. This selection may be achieved by selecting desired information in turn from various kinds of frame information, image information, document information, and the like stored in the data storage device 15. For example, a large number of pieces of information stored in the data storage device 15 are displayed in a size that can be specified in units of specific groups, and desired ones are selected in turn from the input device 11.

When the display size (printout size) of the selected information or the already selected information during selection need be changed, the processing shown in FIG. 3 is started. In step S31, the right end portion of the upper outer frame window 20 in FIG. 2, which is being displayed on the display device 13, is pulled using a mouse to change its size.

When a size change instruction has been issued, the flow advances to step S32 to check if the rendering attributes of all the objects, the sizes of which have been changed, are determined. Since the rendering attributes of all the objects are not determined initially, the flow advances from step S32 to step S33, and a new attribute of each object that forms a window after the size change is determined in correspondence with the size change of the set on the basis of the rendering attribute held by that object. After that, the flow returns to step S32.

For example, in case of the object 21 shown in FIG. 2, the size W21 of the object 21 is determined by a rendering attribute $f21w(\alpha)$ on the basis of a ratio ($\alpha$) between the size change difference (W24−W20) and the size W20 before the size change, and its rendering position is determined by a rendering attribute $f21x(\alpha)$. New attributes of other objects are similarly determined in correspondence with their rendering attributes.

After the rendering attributes of all the objects are determined in this way, the flow advances from step S32 to step S34, and all the objects are rendered based on the newly determined rendering attributes.

Note that the objects may be rendered based on the new rendering attributes after all the rendering attributes are determined, as shown in the flow chart in FIG. 3. However, the present invention is not limited to such specific method. For example, an object may be rendered immediately after one rendering attribute is determined.

In FIG. 2, the size change in only the horizontal direction (x-direction) has been exemplified. However, by combining the size change in the vertical direction (y-direction), objects with various sizes may be intentionally placed at various positions within the window.

In this fashion, when, for example, a frame is expressed by a set of a large number of objects, and rendering attributes are assigned in units of objects as building elements of the frame, independent rendering attributes can be provided in units of building elements of the frame upon changing the size of the frame. By appropriately setting the rendering attributes in units of objects, when the size of the object set has been changed, the objects can be naturally rendered in accordance with an original purpose of the object set in terms of their positions and sizes as a result of rendering based on the rendering attributes upon size change which are held by the objects that form the object set.

Figure 4:
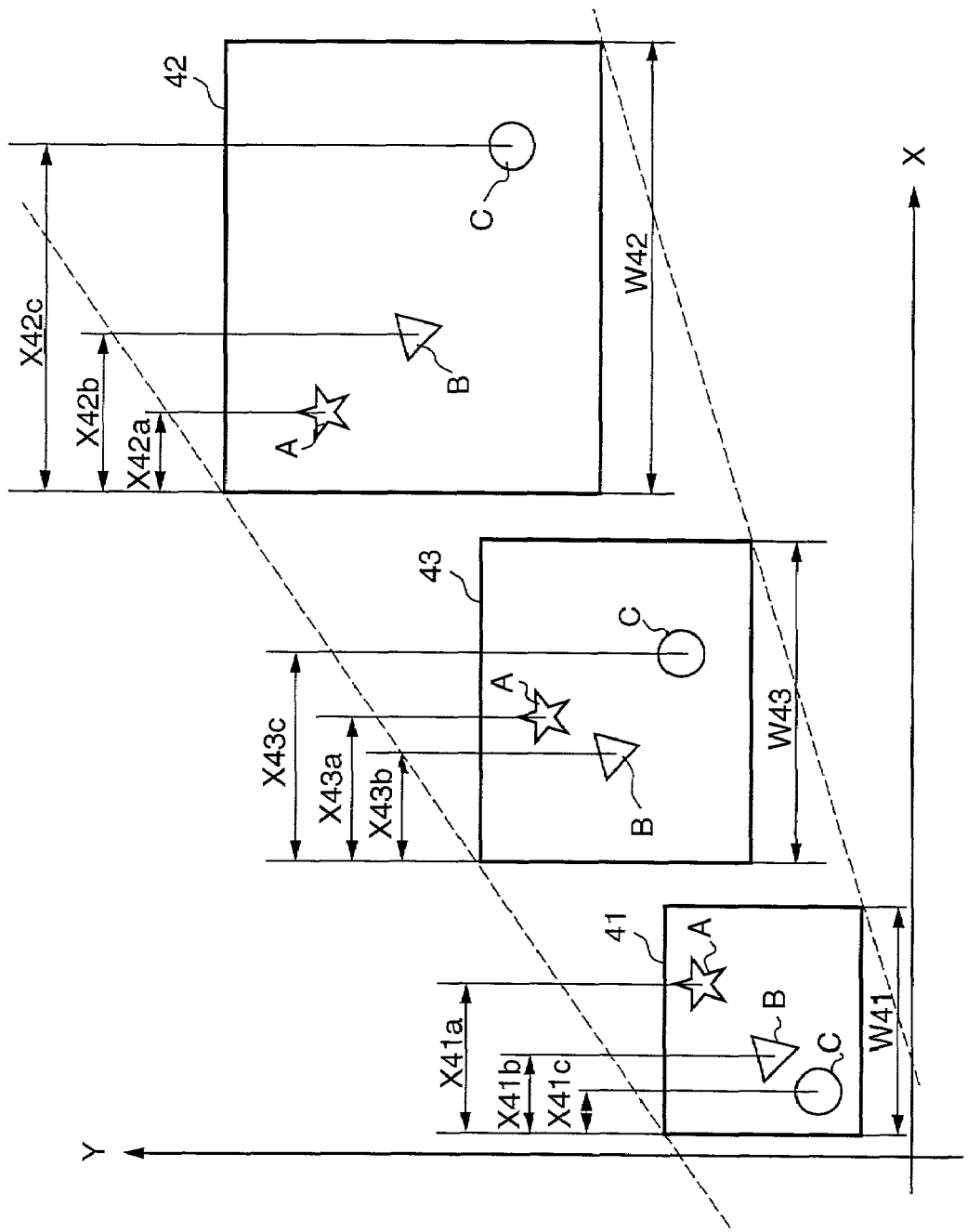
FIG. 4 is a view for explaining the method of determining attribute upon changing size in the embodiment of the present invention.

A method of determining an independent rendering attribute in units of objects upon changing the size of an object group in the embodiment of the present invention will be explained below. FIG. 4 is a view for explaining the method of determining a rendering attribute upon change of window size in this embodiment. FIG. 4 exemplifies a window defined by three objects as an object set. More specifically, FIG. 4 shows the display states rendered on the display device 13 when the size has been changed to first and second sizes, and an intermediate size between the first and second sizes in both the horizontal (x-axis) and vertical (y-axis) directions.

Note that the following description will be focused on the movements of objects in the horizontal direction (x-axis direction) for the purpose of easy understanding. The same applies to the vertical direction (y-axis direction). In FIG. 4, window positions are intentionally moved obliquely upward to the right for the sake of convenience. However, the reference positions of the windows displayed on the display device 13 remain the same.

Referring to FIG. 4, reference numeral 41 denotes a display example based on rendering attributes in the first size, i.e., an object example as a window having a reference x-coordinate value (x1). Reference numeral 42 denotes a display example based on rendering attributes in the second size, i.e., an object example as a window having a reference x-coordinate value (x2). Reference numeral 43 denotes a display state rendered on the display device 13, when the intermediate size between the first and second sizes is designated, i.e., an object example as a window having an arbitrary x-coordinate value (x3).

Reference symbol A denotes a star object rendered by a closed area of a Bezier curve as one object; B, a triangle object rendered by a closed area of a Bezier curve as another object; and C, a circle object rendered by a closed area of a Bezier curve as still another object.

In the window 41 having the reference x-coordinate value (x1), reference numeral W41 denotes the width of the outer frame window 41; X41a, the x-coordinate of object A in the window 41; X41b, the x-coordinate of object B in the window 41; and X41c, the x-coordinate of object C in the window 41.

Furthermore, in the window 42 with the reference x-coordinate value (x2), reference numeral W42 denotes the width of the outer frame window 42; X42a, the x-coordinate of object A in the window 42; X42b, the x-coordinate of object B in the window 42; and X42c, the x-coordinate of object C in the window 42.

In this embodiment, not only the examples shown in FIG. 4 but also objects and rendering attributes in the first size (reference values x1 and y1), and those in the second size (reference values x2 and y2) are held in, e.g., the data storage device 15 for all the frame objects which can be edited by the edit processor 12. In the same manner as in the example to be described below, objects can be rendered upon changing to every size.

More specifically, when a change of an object to an arbitrary size is designated, the rendering attributes of the first and second sizes are compared to obtain a rendering attribute for the designated arbitrary size on the basis of the change amount between the two rendering attributes, thus determining the rendering attribute of the object in correspondence with the size change.

In the object 43 as the outer frame window with the determined arbitrary x-coordinate value (x3), reference numeral W43 denotes the width of the outer frame window 43; X43a, the x-coordinate of object A in the window 43; X43b, the x-coordinate of object B in the window 43; and X43c, the x-coordinate of object C in the window 43.

The rendering attribute W43a indicating the rendering position of object A in the window 43, i.e., the rendering attribute of object A in the arbitrary size is determined by obtaining the ratio of the rendering position W43a of object A to the width W43 of the window 43 on the basis of the change amount between the ratio of the rendering position W41a of object A to the width W41 of the window 41, and the ratio of the rendering position W42a of object A to the width W42 of the window 42.

The same applies to the rendering attributes 43b and 43c of objects B and C. Furthermore, the widths of the respective figures in the arbitrary size upon rendering objects A, B, and C are similarly determined by comparing the change amounts of the widths of the figures of the individual objects in the windows 41 and 42.

Figure 5:
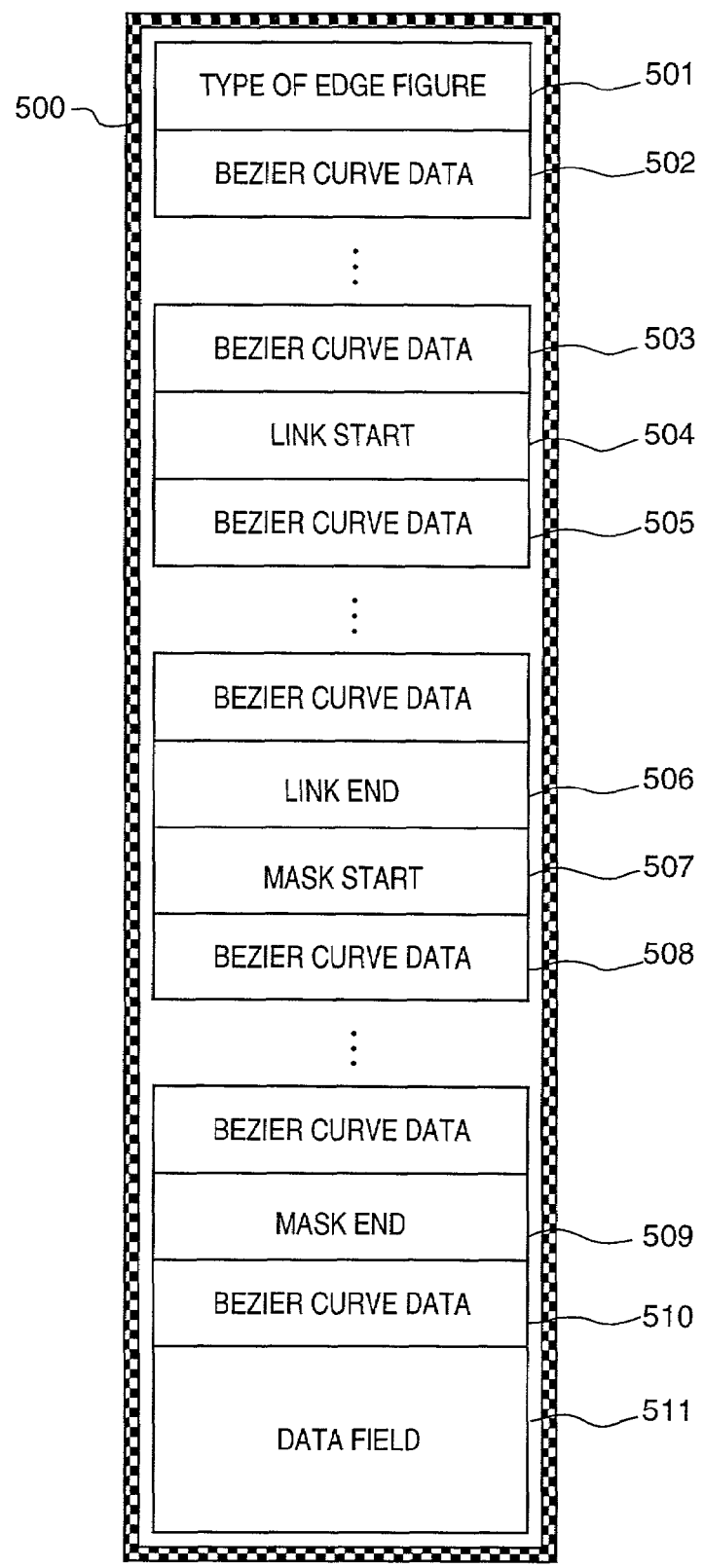
FIG. 5 shows an example of attributes of star object A in the embodiment of the present invention.

FIG. 5 shows some attributes of object A as an example of the data structure of each object.

Referring to FIG. 5, reference numeral 501 denotes data indicating the type of figure; 502, Bezier curve data as the coordinate position of an object in the window with the minimum reference x-coordinate value x1 shown in FIG. 4; 503, Bezier curve data as the coordinate position of an object in the window with the maximum reference x-coordinate value x2 shown in FIG. 4; and 504, link start flag data of a Bezier curve for rendering object A.

Reference numeral 505 denotes Bezier curve data for rendering object A; 506, link end flag data of a Bezier curve for rendering object A; 507, link start flag data of a Bezier curve for setting a mask used for adding a background to object A; 508, Bezier curve data for setting the mask; 509, link end flag data of Bezier curve data used for setting the mask; 510, Bezier curve data for setting an area of an image or characters to be embedded in object A; and 511, image or character data to be embedded in object A.

Figure 6:
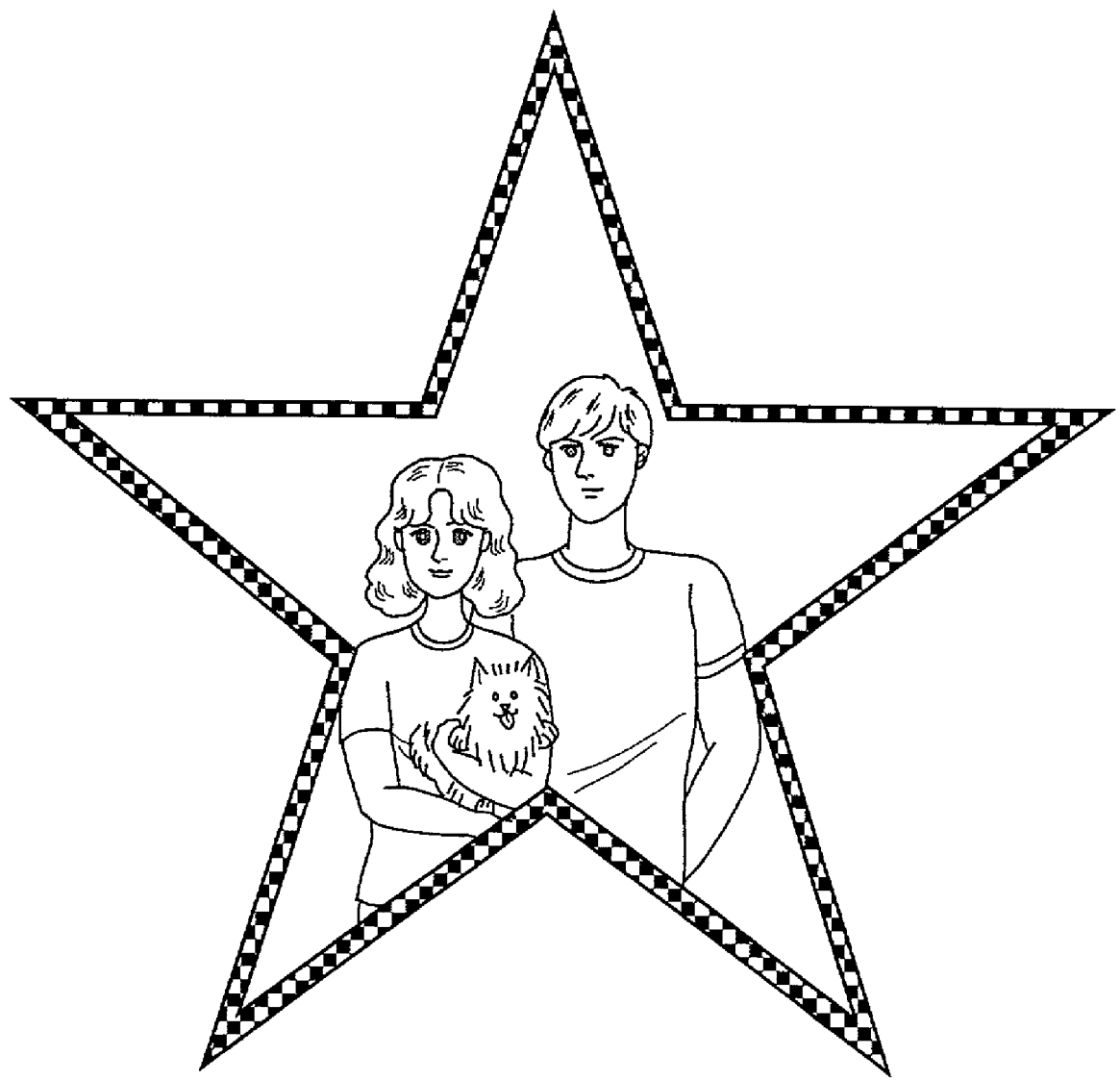
FIG. 6 shows a display example of the object having the attributes shown in FIG. 5.

FIG. 6 shows a display example of the object with the attributes shown in FIG. 5. In the example shown in FIG. 6, a figure embedded (fitted) in object A is displayed so that a portion outside object A is automatically deleted. For example, when object A is enlarged or reduced, as shown in FIG. 4, the display range of the figure varies. In this case, the center of the image remains the same, and the positional relationship obtained when the image was pasted by the input device 11 is held.

Figure 7:
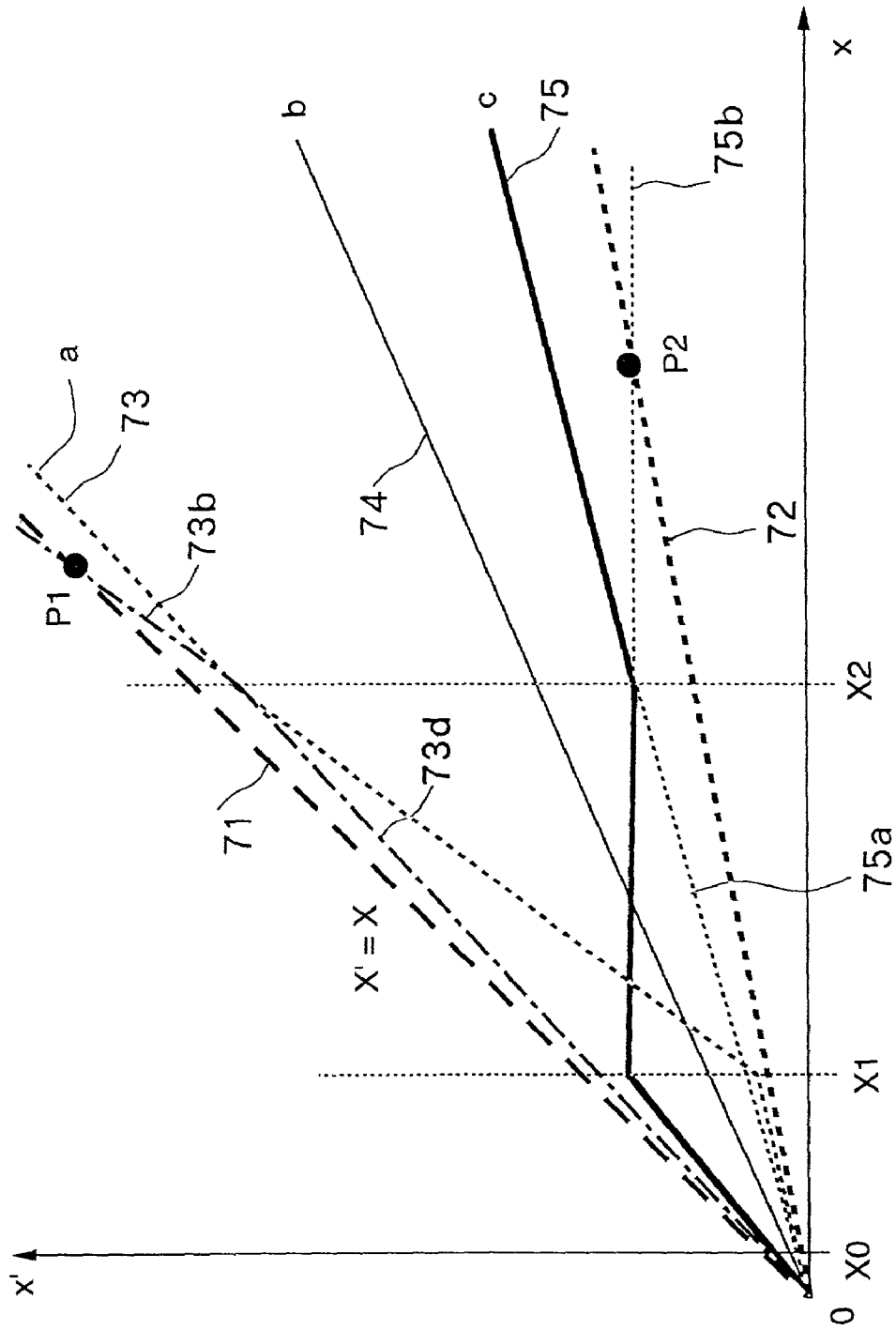
FIG. 7 is a graph showing an example of changes in x-coordinates of the individual objects shown in FIG. 4.

FIG. 7 is a graph showing an example of changes in x-coordinates of the individual objects in FIG. 4.

Referring to FIG. 7, reference numeral 71 denotes the maximum x-coordinate value of the outer frame window in FIG. 4; 72, the minimum x-coordinate value of the outer frame window in FIG. 4; 73, the x-coordinate of object A in FIG. 4; 74, the x-coordinate of object B in FIG. 4; and 75, the x-coordinate of object C in FIG. 4.

In this embodiment, the rendering position is uniquely determined based on the change ratio between the rendering positions of objects in the first and second sizes in principle. However, in the example shown in FIG. 4, the rendering positions of objects A and C considerably vary between the first and second sizes. For example, when such object is enlarged to a size considerably larger than that in the second size, it may fall outside the outer frame window, and disappear from the outer frame window in the extreme case. Since such situation is unpreferable, in this embodiment, when a size other than that between the first and second sizes is designated, the rendering positions of the objects are controlled within the maximum, renderable size range based on the change ratio, so that all the object can fall within the outer frame window.

More specifically, in the example shown in FIG. 7, the coordinate position 73 as the rendering position of object A changes at the change ratio between x1 and x2, as indicated by a line 73b, and object A falls outside the outer frame window at a position p1. For this reason, at a position outside x2, the change ratio of the rendering position is controlled to prevent the rendering position as the coordinate position corresponding to a position on an extended line of a line 73a that connects the position of size 0 and the position of object A at x2 from reaching a position outside the maximum x-coordinate value 71 of the outer frame window.

The same applies to object C. That is, the coordinate position as the rendering position of object C changes at the change ratio between x1 and x2, as indicated by a line 75b, and object C falls outside the outer frame window at a coordinate position p2. For this reason, at a position outside x2, the change ratio of the rendering position is controlled to prevent the rendering position as the coordinate position corresponding to a position on an extended line of a line 75a that connects the position of size 0 and the position of object C at x2 from reaching a position outside the minimum x-coordinate value 72 of the outer frame window.

The same applies to control in the y-direction.

According to the aforementioned embodiment, when the size of the object set has been changed, the objects can be naturally rendered in accordance with an original purpose of the object set in terms of their positions and sizes as a result of rendering based on the rendering attributes upon size change which are held by the objects that form the object set. Furthermore, when the outer frame window is set for the objects, even when the objects are enlarged, the enlarged objects can be prevented from falling outside the outer frame window so as to fulfill the purpose of the object set.

As an example upon executing the processing shown in FIG. 3, variable magnification/rendering processing of the object set shown in FIG. 4 will be explained below.

Referring to FIG. 4, when the size of the outer frame window 41 is changed by pulling its right end or lower right portion using a mouse (S31), it is checked if the size of each object that forms the window is changed within the range between the minimum and maximum reference x-coordinate values x1 and x2 (S32).

If the change falls within the range between x1 and x2, the coordinate position of each object is determined on the basis of its rendering attribute within the range of the mapped x1 and x2. On the other hand, if the change is larger than x2 and the extended lines of the mapped x1 and x2 do not intersect the maximum x-coordinate value 71 and minimum x-coordinate value 72 of the outer frame window, the coordinate position of each object is determined on the basis of its rendering attribute within the mapping range of x1 and x2.

If the change is larger than x2 and the extended lines of the mapped x1 and x2 intersect the maximum x-coordinate value 71 and minimum x-coordinate value 72 of the outer frame window (p1, p2), the coordinate position of each object is proportionally determined on the basis of the position x2. Furthermore, if the change is smaller than x1 and the extended lines of the mapped x1 and x2 do not intersect the maximum x-coordinate value 71 and minimum x-coordinate value 72 of the outer frame window, the coordinate position of each object is determined on the basis of its rendering attribute within the mapping range of x1 and x2.

Moreover, if the change is smaller than x1 and the extended lines of the mapped x1 and x2 intersect the maximum x-coordinate value 71 and minimum x-coordinate value 72 of the outer frame window, the coordinate position of each object is proportionally determined on the basis of the position x1 up to a limit value x0.

As described above, upon changing the size of the object set, new attributes are determined on the basis of attributes held by the individual objects and the reference values at two or more points (S33).

For example, the change x3 of the outer frame window 43 in the x-axis direction falls within the range between the reference values x1 and x2, and objects A, B, and C change within the mapping range of x1 and x2. In this case, the rendering position X43b of object A is determined by a Bezier attribute f(W43) shown in FIG. 5 on the basis of the width W43 after the change. New attributes of other objects are determined in accordance with their attributes.

After the rendering attributes for all the objects are determined (S32), all the objects are rendered using the newly determined rendering attributes (S34).

Note that instead of rendering objects based on new rendering attributes after all the rendering attributes are determined, as in step S34, each object may, for example, be rendered immediately after one rendering attribute is determined.

In FIG. 4, the size change in only the horizontal direction (x-direction) has been exemplified. Also, since the rendering attributes are similarly determined in the vertical direction (y-direction), objects with various sizes may be intentionally placed at various positions within the window.

As described above, according to this embodiment, when the size of the object set has been changed, the objects can be naturally rendered in accordance with an original purpose of the object set in terms of their positions and sizes as a result of rendering based on the rendering attributes upon size change which are held by the objects that form the object set.

The relationship between processing of document or image information embedded (fitted) in the outer frame window (frame) and the frame attribute will be explained below.

In this way, the size of the frame is set. In this embodiment, the data storage device 15 registers a plurality of frames as templates in advance, and also registers image information, document information, and the like to be fitted. A desired frame, figure, document, and the like are selected as needed using the display screen of the display device 13, and can be arbitrarily combined and printed out by the printing apparatus 14.

Also, document information and image information may be independently input from the input device 11 in an arbitrary step of combination, and can be embedded.

Figure 8:
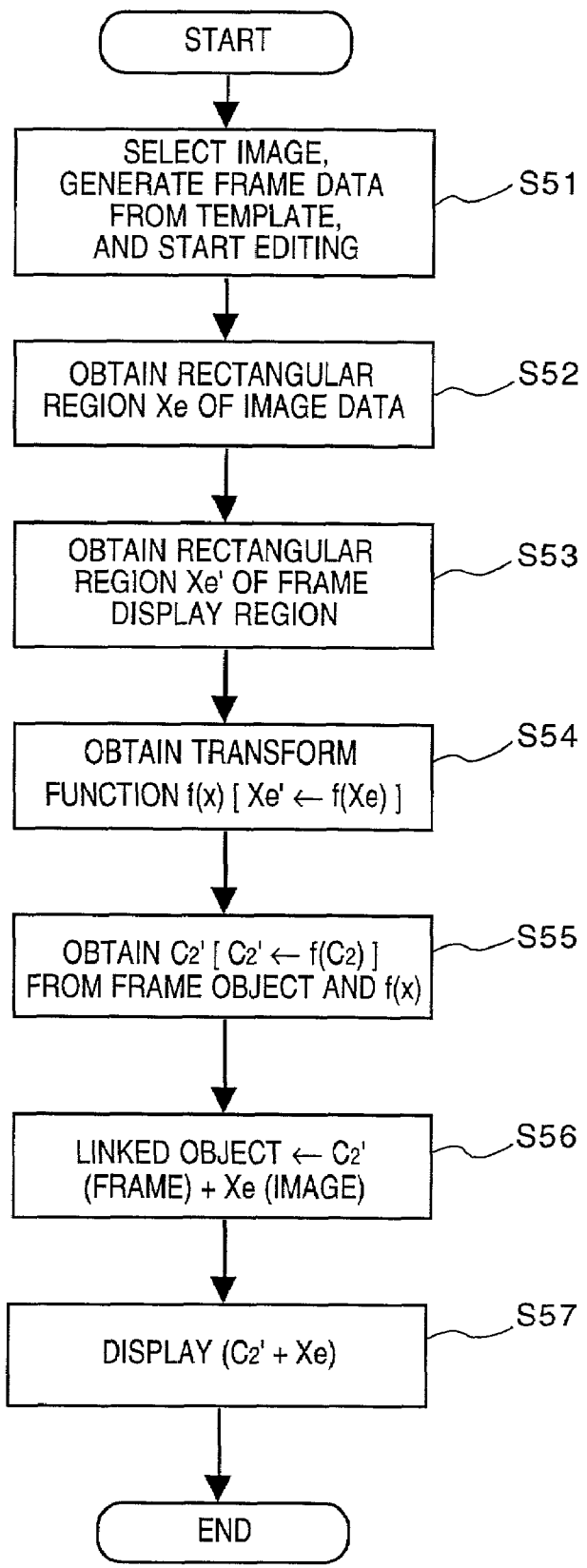
FIG. 8 is a flow chart showing selection processing of a frame and processing for embedding image data into the frame in the embodiment of the present invention.

Selection of a frame, and processing for embedding data into the frame in this embodiment will be described in detail below. The processing for embedding image data into a frame (photoframe) will be explained below with reference to the flow chart in FIG. 8. FIG. 8 is a flow chart showing selection of a frame and embedding of image data into the frame in this embodiment.

The operator selects image data and a photoframe in which the image data is to be embedded in step S51. This selection is made in, e.g., the following procedure. A list of thumbnails of a plurality of images registered in advance in the data storage device 15 are displayed on the right side of the display screen of the display device 13. When the operator double-clicks a desired one of the displayed image data using the mouse of the input device 11, that image is selected and is displayed as an enlarged figure on the left side of the screen.

The operator may drag and drop a desired image on the left side of the screen using the mouse to display an enlarged figure. Furthermore, when the input device 11 has an image input device such as a scanner, CD-ROM device, FD device, digital camera, or the like, image data may be read from the image input device, and the read image may be displayed on the left side of the screen as image data with a predetermined size.

Subsequently, the operator displays a selection screen of photoframes as frames designed to embed image data of those registered in advance in the data storage device 15 on the display screen of the display device 13. The operator then selects a desired one of the displayed photoframes. This selection is made by such as double-clicking the mouse of the input device 11.

Alternatively, the operator may drag and drop a desired photoframe onto the image data using the mouse.

A case will be exemplified below wherein rectangular image data is selected as image data, and a circular photoframe is selected as a photoframe.

Figure 9:
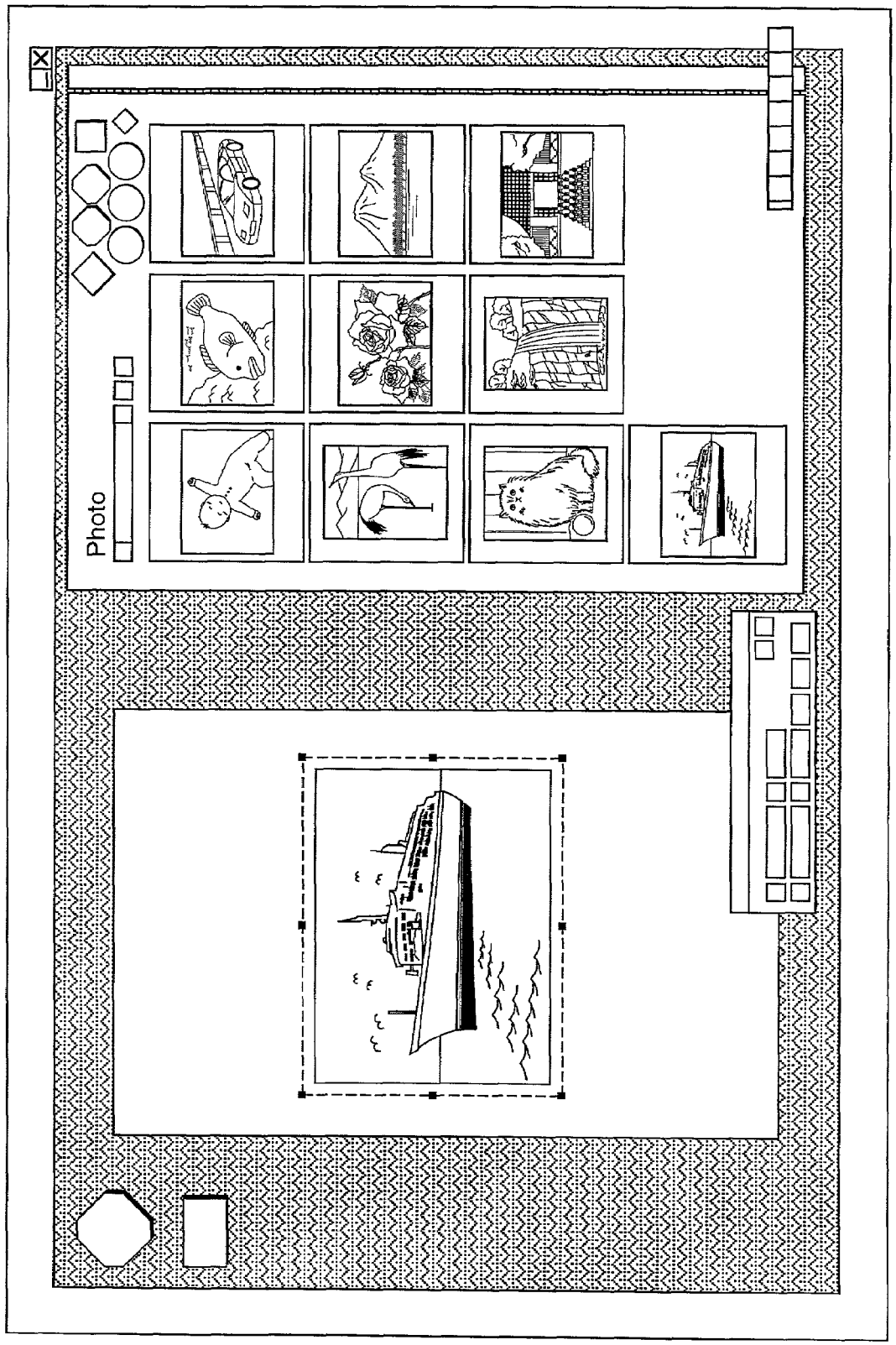
FIG. 9 is a view for explaining the extracted state of an inclusive rectangular region of image data in the embodiment of the present invention.

Upon completion of selection of image data and photoframe in step S51, rectangular region data Xe of the image data is extracted in step S52. In this case, an erected (non-rotated) inclusive rectangular region is extracted. FIG. 9 shows the extracted state. FIG. 9 is a view for explaining the extracted state of this inclusive rectangular region.

In step S53, the edit processor 12 calculates a rectangular region in a frame (display region) of the selected photoframe. More specifically, erected (non-rotated) inclusive rectangular region data Xe' is similarly extracted on the basis of a region defined by a closed Bezier curve that forms the image frame of the selected image data.

In step S54, a transform function f(x) for mapping from the rectangular region data Xe of the image data to the rectangular region data Xe' of the photoframe is obtained. In step S55, a frame object C2 is transformed by the above-mentioned method based on the transform function f(x) to obtain a new frame object C2' which is enlarged or reduced in correspondence with the image size.

Figure 10:
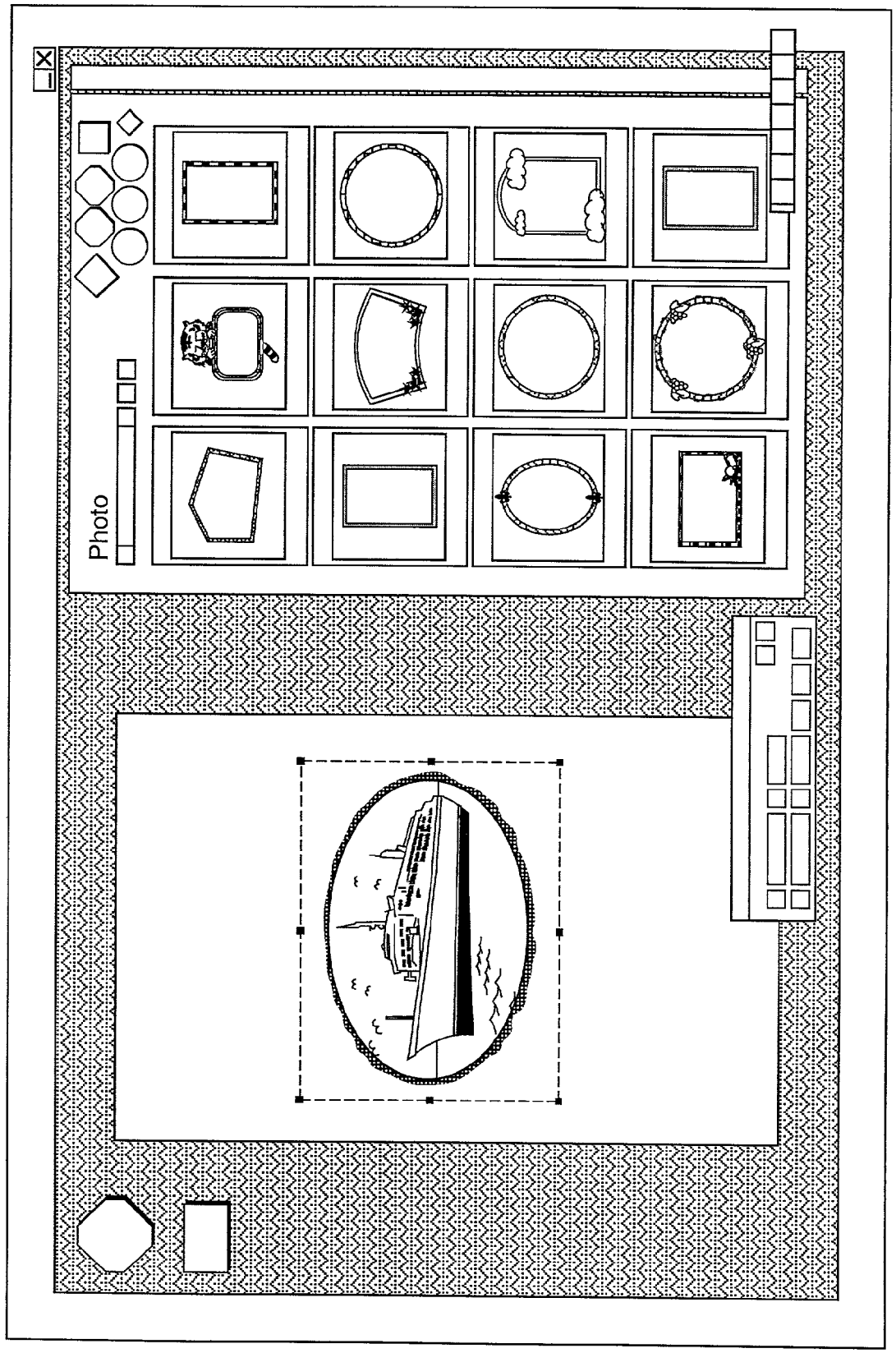
FIG. 10 shows the embedded state of selected image data in a photoframe in the embodiment of the present invention.

In step S56, the image data Xe is embedded and linked into the image data storage region of the image frame of the new frame object C2' to paste the image data to the image frame. In step S57, the linked object of image data with the new image frame is stored in the data storage device 15, and is displayed on the display screen of the display device 13. FIG. 10 shows the display state. FIG. 10 shows the embedded state of the selected image data into the selected frame.

As described above, according to this embodiment, when image data is embedded into a photoframe, the photoframe is enlarged/reduced by the above-mentioned method on the basis of the image data, i.e., in correspondence with the extracted state of the inclusive rectangular region of the image data, thus attaining fitting in a pattern corresponding to the image data without changing the basic pattern of the photoframe.

Figure 11:
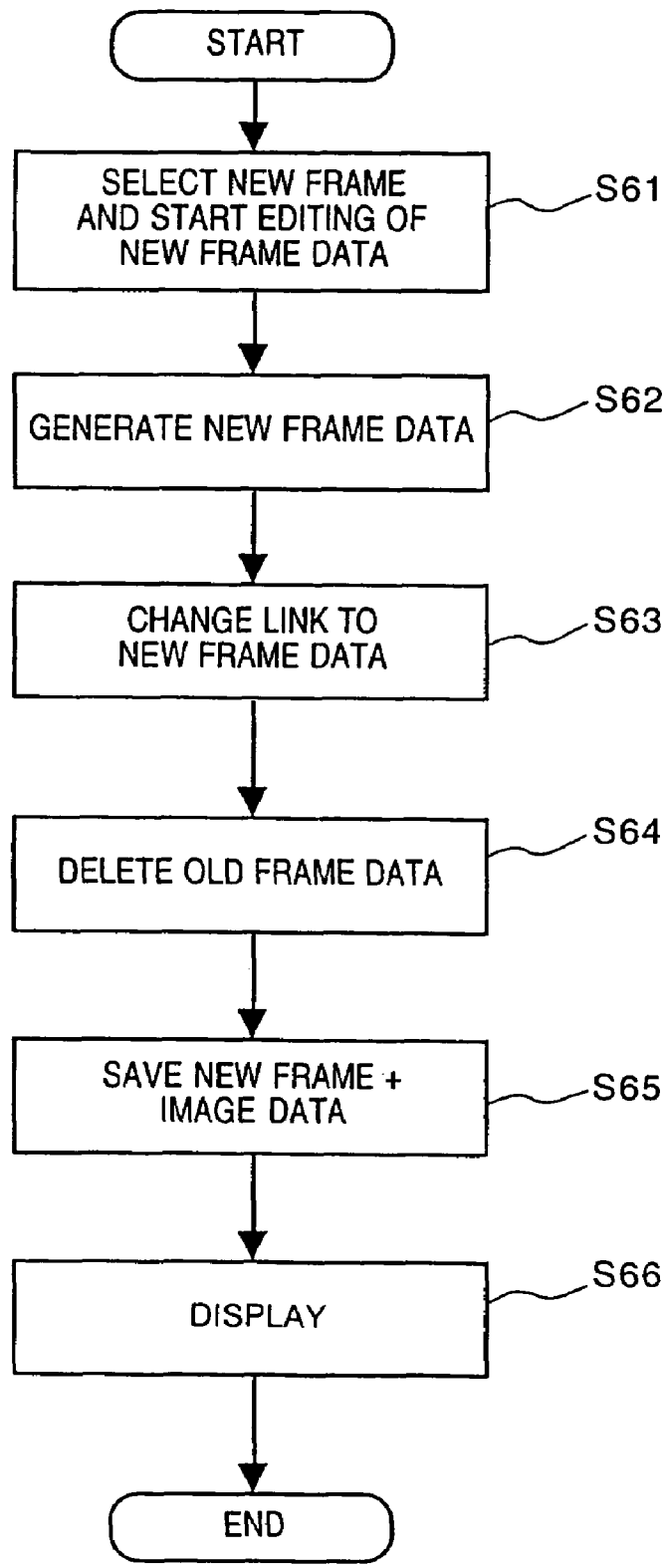
FIG. 11 is a flow chart showing replacement of a photoframe in the embodiment of the present invention.

Processing for replacing a photoframe to another one after the photoframe is assigned to the selected image to embed it will be described below with reference to FIG. 11. FIG. 11 is a flow chart showing replacement of a photoframe in this embodiment.

When a photoframe is to be replaced, templates of photoframes are displayed again on the left side of the screen, and a new photoframe to replace the old one is selected by, e.g., double-clicking the mouse of the input device 11, thus starting editing of the new frame data (step S61 in FIG. 11). On the other hand, a new frame to replace the old one may be dragged and dropped onto the displayed frame which has already been linked to image data.

In this case, new frame data is generated in step S62. The processing in step S52 to S55 shown in FIG. 8 is executed for the new frame to generate frame data (frame object).

In step S63, image data is linked to the newly obtained frame object, i.e., the new frame data.

Figure 12:
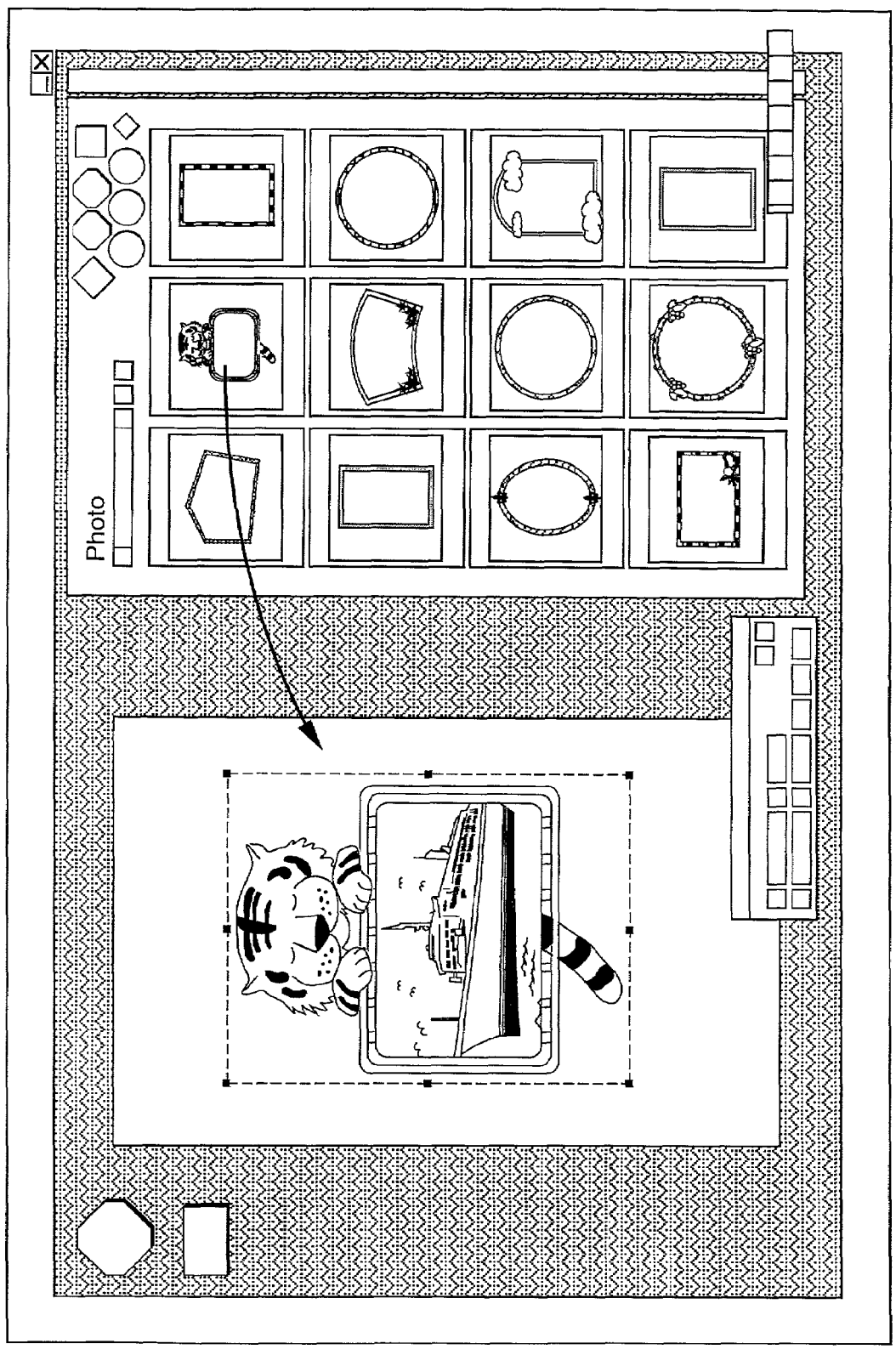
FIG. 12 shows the replacement result of the photoframe in the embodiment of the present invention.

In step S64, the old image frame displayed so far is deleted. In step S65, the image data linked to the new image frame is stored in the data storage device 15. At the same time, that image data is displayed on the display device 13 in step S66. FIG. 12 shows a display example in which the photoframe has been changed.

In this manner, the photoframe can be easily replaced.

Figure 13:
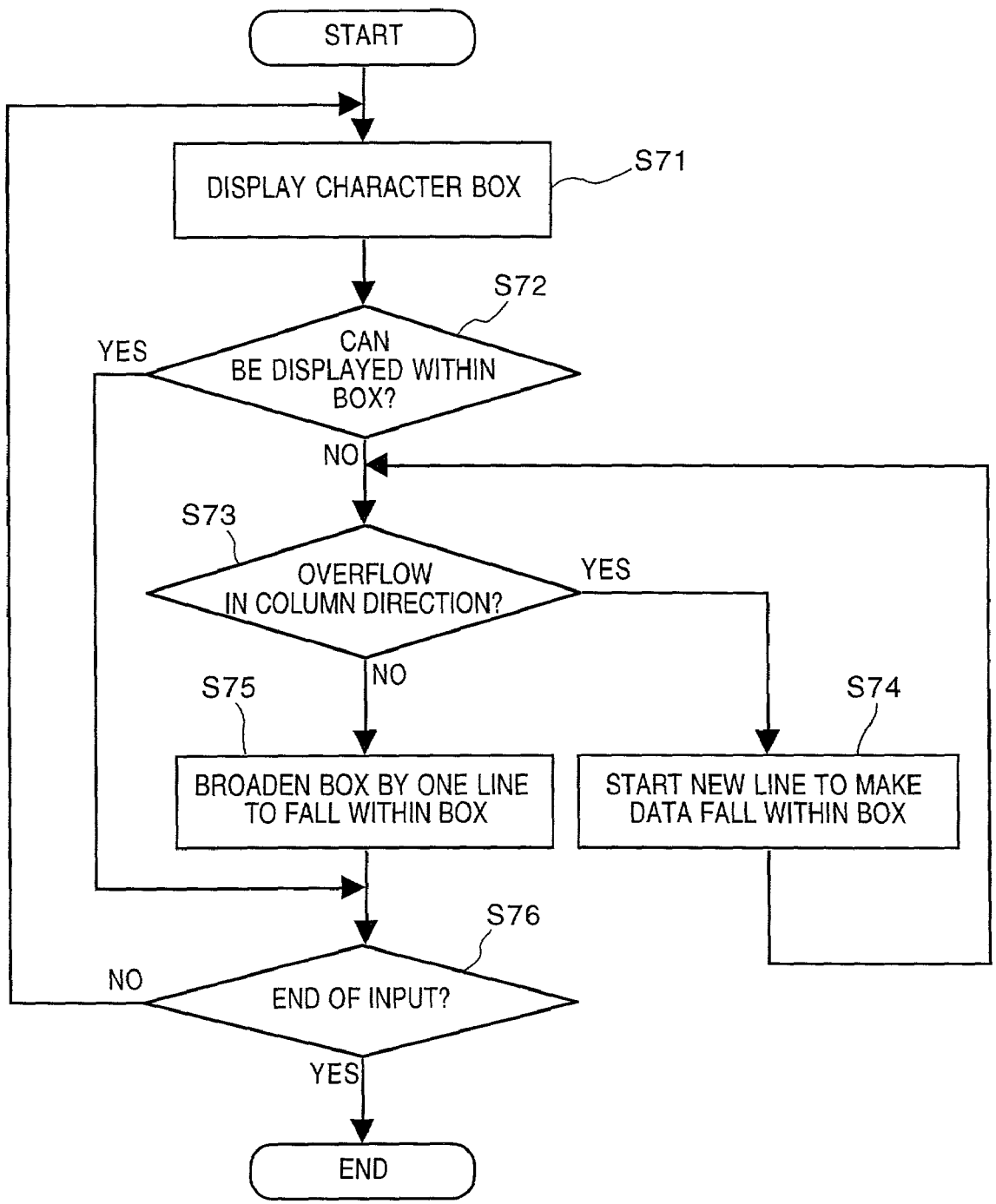
FIG. 13 is a flow chart showing generation of character data in the embodiment of the present invention.

In this embodiment, character data can be handled in addition to the aforementioned image data, and can be embedded into a character box frame. The character data may be stored in advance in the data storage device 15, and may be read out when they are used. Also, the character data may be directly input by, e.g., a keyboard of the input device 11. Generation processing of character data by the input device 11 (generation processing of a character label) will be described below with reference to the flow chart in FIG. 13. FIG. 13 is a flow chart showing the generation processing of character data in this embodiment.

When a character box is selected, the character box having a predetermined rectangular region 130 (FIG. 14) is displayed on the left side of the screen, and characters can be input from the upper left position of the character box. Before characters are input, a guidance that prompts the operator to input characters (FIG. 14) is displayed. After more than one characters are input, this guidance disappears, and the input characters are displayed.

Figure 14:
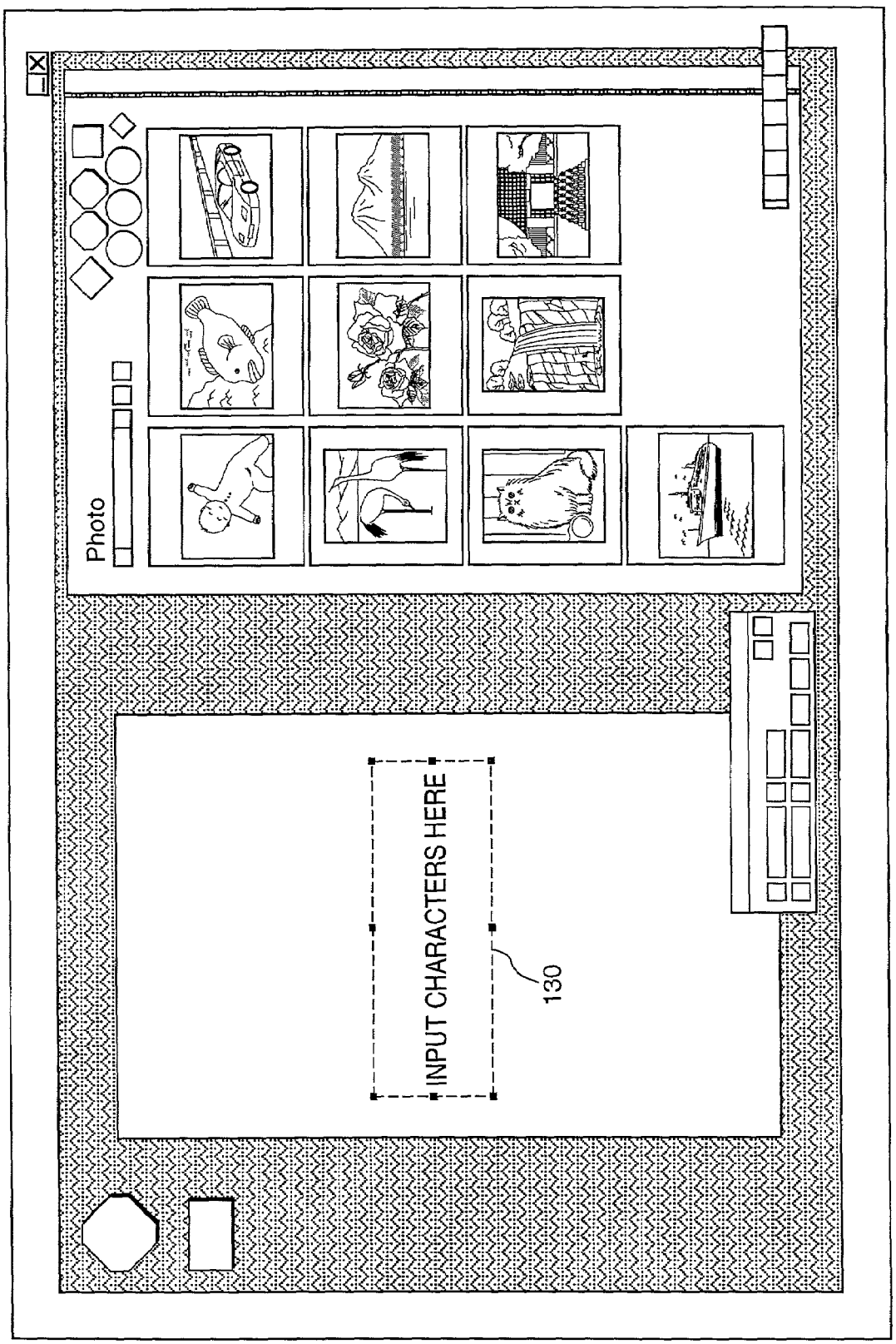
FIG. 14 is a view for explaining an input character box of character data in the embodiment of the present invention.

In this embodiment, characters can always be input, and the character box shown in FIG. 14 is set all the time. As a consequence, whenever characters are input, they are input from the upper left position of the character box shown in FIG. 14. When the character box is selected, it is automatically displayed in step S71.

When characters are input, the input characters are displayed within the character box. It is then checked in step S72 if the input characters can be continuously displayed within the character box. If YES in step S72, the flow advances to step S76 to check if the input ends and this character box is selected. If the character box is not selected, the flow returns to step S71 to prepare for the next input.

If it is determined in step S72 that the input characters cannot be continuously displayed within the character box, i.e., if a character overflows from the character box, it is checked in step S73 if the character overflows in the column or row direction. If the character overflows in the column direction, the flow advances to step S74, and a new line is started after the immediately preceding character to display a newly input character at the head of the new line within the character box. The flow then returns to step S73.

On the other hand, if it is determined in step S73 that the character overflows in the row direction, the box is broadened by one line to display the input character within the character box in step S75, and the flow then advances to step S76. In this manner, the character input proceeds sequentially, and when the input result is registered as an effective one, the end of input is instructed to set the generated character box and character information within the character box as effective information.

The registered character box and character data have, for example, the following data structure. The data structure of a character box with a rectangular region is configured by Bezier closed curve data (rectangular region) that defines the rectangular region of the character box, format information for allocating characters within the character box, and character information allocated within the character box.

In this way, a character box object having a rectangular character allocation region object is generated.

Figure 15:
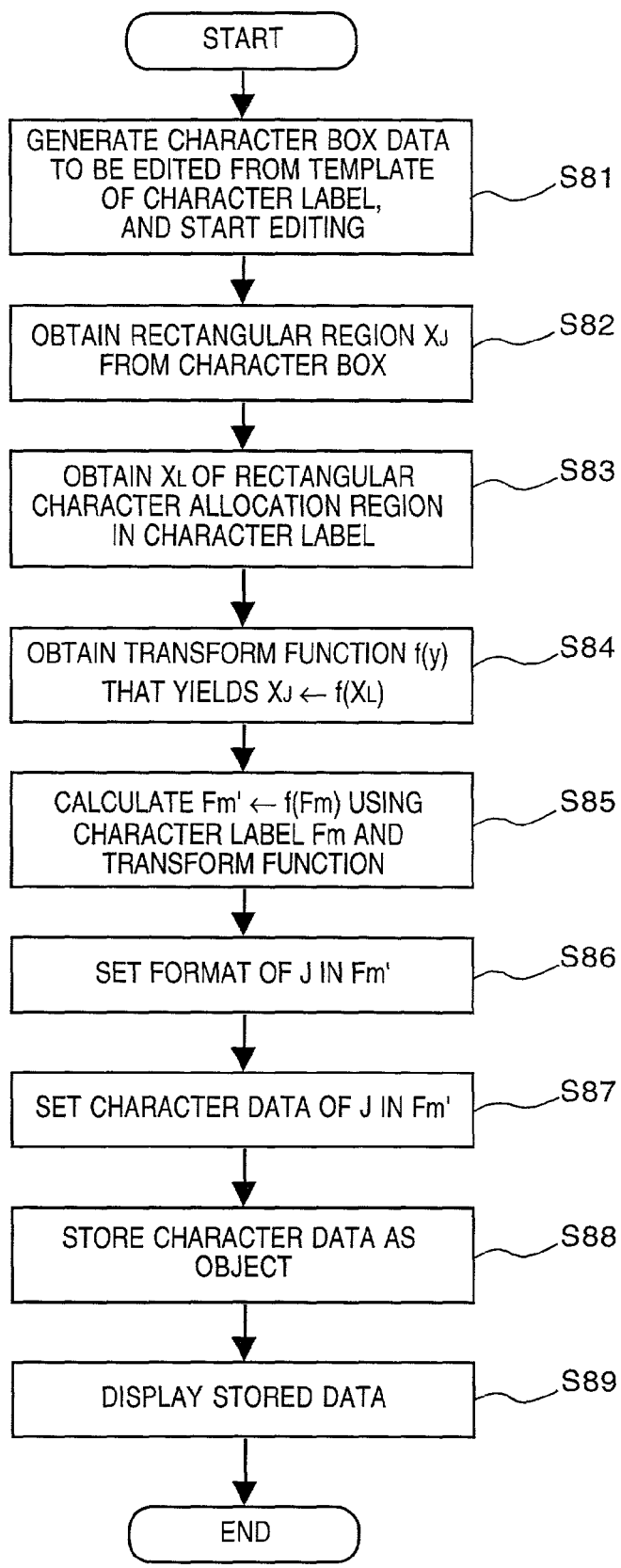
FIG. 15 is a flow chart showing processing for embedding character data into a character box frame in the embodiment of the present invention.

Processing for embedding the character box object generated in this way into a character box frame will be explained below with reference to the flow chart shown in FIG. 15. FIG. 15 is a flow chart showing the processing for embedding character data (document data) into a character box frame in this embodiment. With this processing, an arbitrary character box frame (character label) having a natural size and the like can always be linked outside the rectangular region of an arbitrary character box object (to be referred to as a character box hereinafter).

In step S81, a large number of character box frames in which characters can be embedded and which are registered in the data storage device 15 are displayed on the right side of the screen, and a desired character box frame is selected in the same manner as in the photoframe. At the same time, a character box (character data) registered in, e.g., a template is selected. Alternatively, characters may be input in advance as described above, and a desired character box frame is selected. Linking of the character box frame and character data is then started.

In step S82, the edit processor 12 obtains rectangular region data Xj from Bezier closed curve data (rectangular region) of the selected character box object. Furthermore, in step S83, the edit processor 12 obtains rectangular region data Xl from a rectangular character box region that defines the selected character box frame (character label).

In step S84, a transform function f(y) for mapping from the rectangular region data Xl to the rectangular region data Xj is obtained. In step S85, a character box frame (character label) Fm is transformed (enlarged/reduced) by the above-mentioned frame variable magnification processing method on the basis of the transform function f(y) to obtain a new character label Fm' corresponding to the size of the character box.

In step S86, the format information of the character box is set in that of the new character label Fm'. In step S87, character data in the character box are embedded in the character data region (a region within the box) of the character label Fm'. The character data region of the character label has a size large enough to cover that of the character box, thus naturally rendering an object set according to the specific purpose of the character box frame.

In step S88, a linked object of a character box with a new character label is stored in the data storage device 15. At the same time, the obtained object is displayed on the display device 13 in step S89. Then, this processing ends.

Upon linking the character label and character data, the character label can also contain data that determines the attribute of character data to be embedded in the character label. When such attribute is set, the embedding result of the character data is determined in accordance with the attribute assigned to that frame.

For example, a character label may be a color label, and may often have a predetermined character display color in terms of balance with the color of the frame portion. In such case, characters are embedded in the predetermined color. When a character label is designed to be displayed with a given angle, character data are also obliquely displayed to fall within the selected character label. In case of image data, whether or not the data is rotated is preferably selected. However, in case of document data, since its fitting state is limited, the attribute of the character label is preferentially used.

Processing for replacing a character label to another one after the character label (character box frame) is assigned to the selected character box to embed character data will be explained below. In this case, the character label is replaced by basically the same processing as that of the photoframe shown in FIG. 11.

When the character label is replaced, templates of character labels are displayed again on the right side of the screen, and a new character label to replace the old one is selected by, e.g., double-clicking the mouse of the input device 11, thus starting replacement with the new character label. Alternatively, a new character label to replace the old one may be dragged and dropped using the mouse on the displayed data of the character box linked to the character label.

In such case, as described above, the newly selected character label is enlarged/reduced in correspondence with the size of the character box to generate new character label data. The new character label data (frame object) is generated by executing the processing in steps S52 to S55 shown in FIG. 8 mentioned above for the new character label.

The character data is linked to the newly obtained character label object. After that, the old character label data displayed so far is deleted. Then, the character data with the new character label is stored in the data storage device 15. At the same time, the character data is displayed on the display device 13. In this manner, the character label can be replaced.

To restate, character data is linked to a character box frame (character label), or image data is linked to a photoframe.

In this embodiment, desired image data (e.g., a photograph) or character data can be freely embedded into a pre-set frame.

Furthermore, in the above description, character data is embedded in a character label, and image data is embedded in a photoframe. Also, a frame in which both character and image data can be embedded is available. When this frame is selected, arbitrary regions within the frame can be selectively used as character and image regions.

Finally, the relationship between the frame and characters or image to be embedded upon changing the size of the frame to which the characters or image are integrally linked will be explained below.

In this embodiment, image data is not subjected to variable magnification processing under any circumstances. For example, when the frame is enlarged, the image data is embedded to be located at the center of the frame. When the frame is reduced, the image data is located at the center of the frame, and a portion falling outside the frame is not displayed. In case of a frame in which both characters and image can be embedded, the frame is enlarged/reduced to maintain the positional relationship of the image frame with respect to the entire frame.

In this embodiment, when both characters and image are included in the frame, and an image region is designated in advance, the size of the image region remains the same independently of the size of the entire frame. Hence, only its display position changes. Note that the positional relationship of the image region can be changed by another processing.

In this way, the size of the image region to which image data is assigned is not changed for the following reasons.

(1) When both characters and image are included in a frame, and the characters are a main object, the image is merely a cut-in illustration. So if its size is changed, it adversely influences the character region.

(2) On the other hand, when the image is a main object, the image is probably trimmed in advance to have an optimal size. Hence, if the frame is enlarged in such case, it is preferable that its display range be prevented from unnecessarily broadening, and the character region that gives an explanation of the image data be broader.

The frame variable magnification processing with respect to the character box will be explained below.

Figure 16:
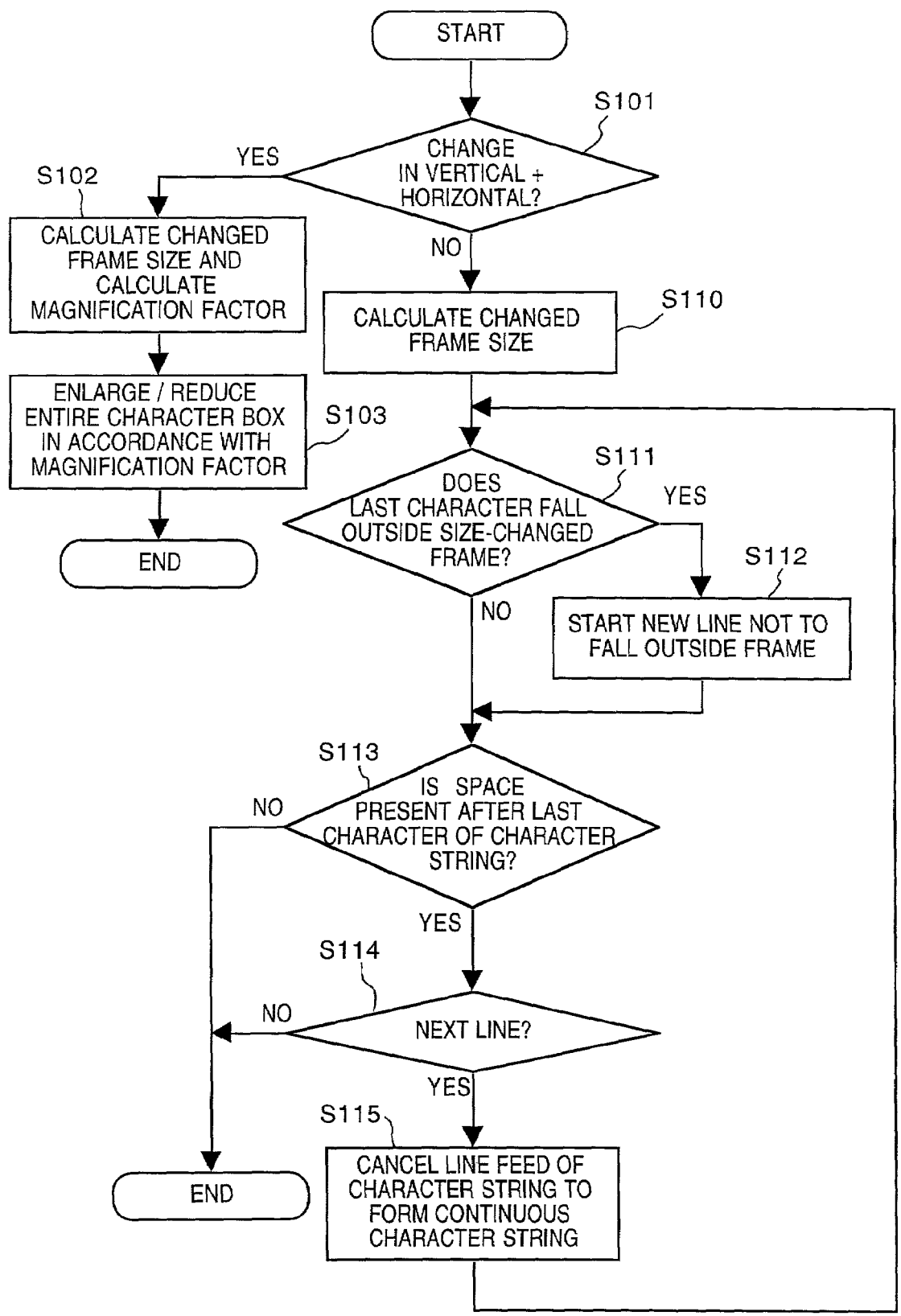
FIG. 16 is a flow chart showing frame variable magnification processing upon completion of embedding of character data into the character box frame in the embodiment of the present invention.
Figure 18:
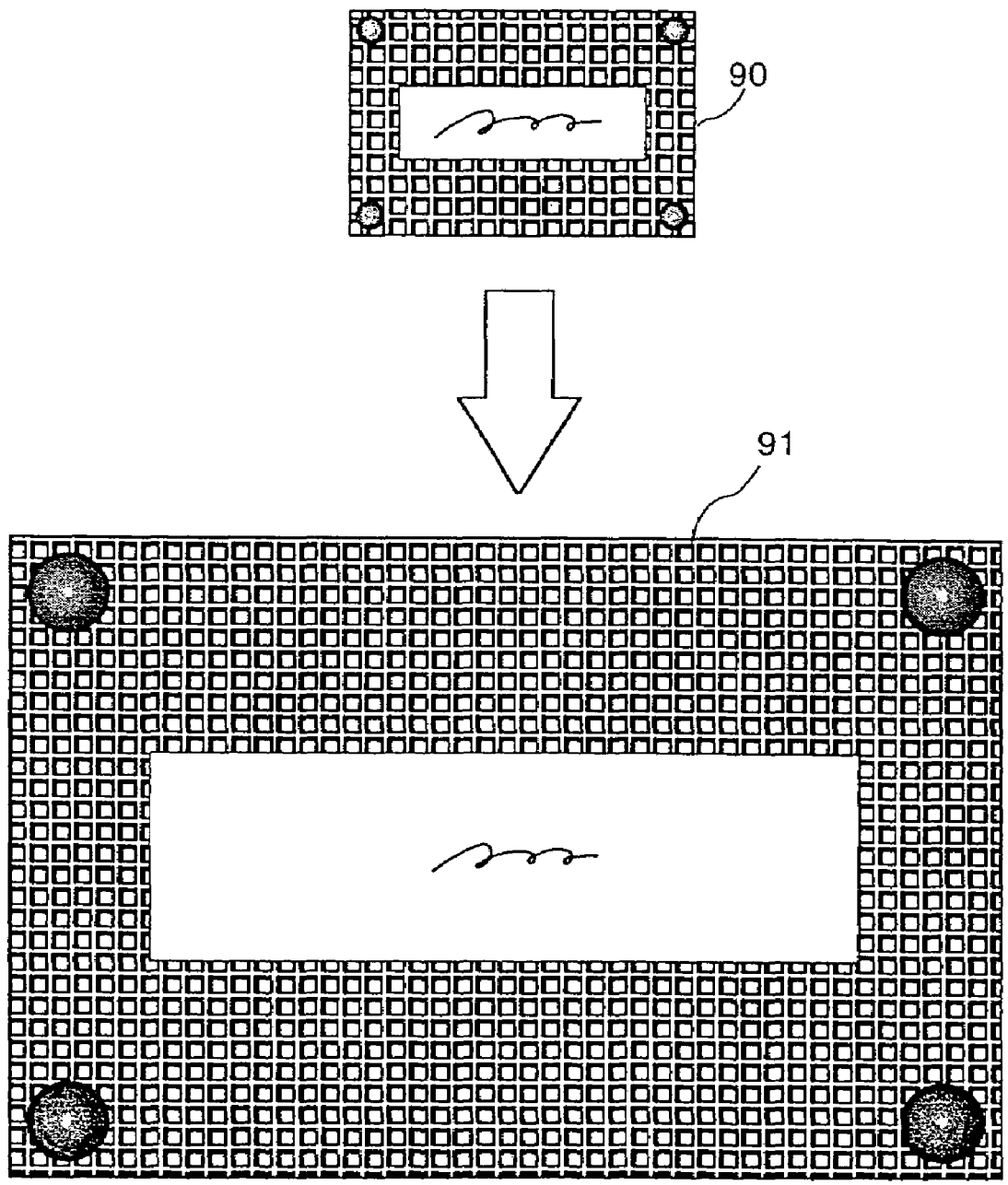
FIG. 18 is a view for explaining conventional frame variable magnification processing.

This embodiment has a characteristic feature in the character box variable magnification processing, and the processing shown in FIG. 16 is made.

More specifically, the edit processor 12 checks in step S101 if the size has been changed in one or both of the vertical and horizontal directions. If the size has been changed in both the vertical and horizontal directions, the flow advances to step S102 to calculate the size in the box of the changed character box frame (a character region when both the character and image regions are present) and to calculate the magnification factor with respect to the original size.

In step S103, the size of the character box object embedded in the original frame is changed in accordance with the calculated magnification factor, and is embedded to just fall within the size-changed frame. Then, the character data with a new character label is stored in the data storage device 15. After that, the variable magnification processing ends.

On the other hand, if it is determined in step S102 that the size has been changed in only the vertical or horizontal direction, the flow advances to step S110 to calculate the changed frame size. Subsequently, in step S111, the character box data (character data) before the size change is fitted into the size-changed frame from a reference initial position, and it is checked if the last characters of respective lines fall outside the frame. If NO in step S111, the flow advances to step S113.

On the other hand, if the characters fall outside the frame, the flow advances to step S112 to adjust the carriage return position of the first line that falls outside the frame to fall within the frame. Then, the flow advances to step S113.

It is checked in step S113 if the last character of a character string for one line does not fall outside the frame and a space is present next to the last character. If a space is present, the flow advances to step S114 to check if the next line is present after the line with the space. If no next line is present, this processing ends.

On the other hand, if it is determined in step S114 that the next line is present, the flow advances to step S115 to cancel line feed of the character string with the space and to form a continuous character string. Then, the flow returns to step S111. As a result of line feed cancel, if the new character string falls outside the frame, the return position of that character string is adjusted to fall within the frame in step S112.

FIGS. 17A to 17C show the frame variable magnification results with the above-mentioned processing. FIG. 17A shows characters in the frame before the size change. FIG. 17B shows an example of characters after the number of lines and the number of characters per line change when the frame size has been enlarged in only the horizontal direction. FIG. 17C shows an example of characters when the size of the frame has been enlarged in both the vertical and horizontal directions.

The aforementioned processing is applied not only to a character label having a character region within the entire frame, but also to a case wherein both character and image regions are present. When both character and image regions are present, the character region alone is varied since the size of the image region remains the same.

To recapitulate, according to the present invention, a character box, a frame that bounds a figure or image, or a grouped figure is handled as an object set, and when the size of the object set has been changed, the object set can be naturally rendered according to the purpose of the frame or grouped figure, i.e., the object sets structured by objects can be processed.

When information embedded in a specific region, e.g., a frame or a region in that frame, is character information, the layout of the character information can be automatically changed, and the size of the character information itself can be easily enlarged/reduced.

Another Embodiment

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the above-mentioned flow charts.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for variable magnification processing of output information, comprising:

holding means for holding output images in a first size and an output position thereof, and holding output images in a second size and an output position thereof, wherein each of said output images is expressed by a plurality of objects, and each of said objects is assigned rendering attributes corresponding to a size and an output position;

selection means for selecting a desired image from the output images held by said holding means, and designating an output size of the selected image;

generation means for generating each output image independently for each of said plurality of objects expressing the image selected by said selection means corresponding to the output size on the basis of a ratio of change in output image size between the first and second sizes defined by the rendering attributes of each of said plurality of objects held by said holding means compared to the output size of the image selected by said selection means;

determination means for determining each rendering position independently of the output images for each of said plurality of objects expressing the image selected by said selection means corresponding to the output position on the basis of a ratio of change in output position between the first and second positions defined by the rendering attributes of each of said plurality of objects held by said holding means compared to the image selected by said selection means; and rendering means for rendering each output image independently for each of said plurality of objects expressing the image selected by said selection means generated by said generation means at the rendering position determined by said determination means, wherein the rendered output image includes frame information of image information, the frame information including fitting information fitted into a frame of the frame information by a fitting means with the fitting information designated by a designation means for the fitting information, and wherein said rendering means displays the output image generated by said generation means on a display screen of a display device.

2. The apparatus according to claim 1, wherein said selection means selects the image from the output images in the first size held by said holding means.

3. The apparatus according to claim 1, further comprising output means for outputting rendering information of said rendering means to an output device that permanently visually displays the rendering information in units of pages.

4. The apparatus according to claim 1, wherein after fitting by said fitting means, a rendering size of the frame information of the image selected by said selection means is allowed to change, and when the rendering size of the frame information is changed after fitting, a fitting position of the fitting information is changed in correspondence with movement of the rendering position determined by said determination means to hold a fitting positional relationship with the frame information.

5. The apparatus according to claim 4, wherein when the fitting information designated by said designation means is image information, said fitting means does not change the fitting information irrespective of the change in size of the frame information of the image selected by said selection means, and renders an image in the fitting information, which corresponds to an interior of a frame of the frame information, as the fitting information in the frame.

6. The apparatus according to claim 1, wherein a moving amount of a rendering position of the output image corresponding to the ratio of change in output position of the output image between the first and second sizes is compressed in the vicinity of an edge portion of an outputtable range so as to prevent the rendering position from falling outside the outputtable range of an output device upon movement of the rendering position determined by said determination means for the output image selected by said selection means.

7. An image processing apparatus for variable magnification processing of output information, comprising:

holding means for holding output images in a first size and an output position thereof, and holding output images in a second size and an output position thereof, wherein each of said output images is expressed by a plurality of objects, and each of said objects is assigned rendering attributes corresponding to a size and an output position;

selection means for selecting a desired image from the output images held by said holding means, and designating an output size of the selected image;

generation means for generating each output image independently for each of said plurality of objects expressing the image selected by said selection means corresponding to the output size on the basis of a ratio of change in output image size between the first and second sizes defined by the rendering attributes of each of said plurality of objects held by said holding means compared to the output size of the image selected by said selection means;

determination means for determining each rendering position independently of the output images for each of said plurality of objects expressing the image selected by said selection means corresponding to the output position on the basis of a ratio of change in output position between the first and second positions defined by the rendering attributes of each of said plurality of objects held by said holding means compared to the image selected by said selection means; and rendering means for rendering each output image independently for each of said plurality of objects expressing the image selected by said selection means generated by said generation means at the rendering position determined by said determination means, wherein the rendered output image includes frame information of image information, the frame information including fitting information fitted into a frame of the frame information by a fitting means with the fitting information designated by a designation means for the fitting information, and wherein said rendering means further renders the output image generated by said generation means as print information to a printing apparatus that prints the output image using the print information.

8. The apparatus according to claim 7, wherein said selection means selects the image from the output images in the first size held by said holding means.

9. The apparatus according to claim 7, wherein after fitting by said fitting means, a rendering size of the frame information of the image selected by said selection means is allowed to change, and when the rendering size of the frame information is changed after fitting, a fitting position of the fitting information is changed in correspondence with movement of the rendering position determined by said determination means to hold a fitting positional relationship with the frame information.

10. The apparatus according to claim 9, wherein when the fitting information designated by said designation means is image information, said fitting means does not change the fitting information irrespective of the change in size of the frame information of the image selected by said selection means, and renders an image in the fitting information, which corresponds to an interior of a frame of the frame information, as the fitting information in the frame.

11. The apparatus according to claim 7, wherein a moving amount of a rendering position of the output image corresponding to the ratio of change in output position of the output image between the first and second sizes is compressed in the vicinity of an edge portion of an outputtable range so as to prevent the rendering position from falling outside the outputtable range of an output device upon movement of the rendering position determined by said determination means for the output image selected by said selection means.

12. An image processing method of an image processing apparatus for variable magnification processing of output information, comprising:
 a holding step of holding output images in a first size and an output position thereof, and holding output images in a second size and an output position thereof, wherein each of said output images is expressed by a plurality objects, and each of said objects is assigned rendering attributes corresponding to a size and an output position;
 a selection step of selecting a desired image from the output images held in said holding step, and designating an output size of the selected image;
 a generation step of generating each output image independently for each of said plurality of objects expressing the image selected in said selection step corresponding to the output size on the basis of a ratio of change in output image size between the first and second sizes defined by the rendering attributes of each of said plurality of objects held in said holding step compared to the output size of the image selected in the selection step;
 a determination step of determining each rendering position independently of the output images for each of said plurality of objects expressing the image selected in said selection step corresponding to the output position on the basis of a ratio of change in output position between the first and second positions defined by the rendering attributes of each of said plurality of objects held in said holding step compared to the image selected in the selection step; and
 a rendering step of rendering each output image used for visualization, the output images rendered independently for each of said plurality of objects expressing the image selected in said selection step generated in the generation step at the rendering position determined in the determination step, wherein the rendered output image includes frame information of image information, the frame information including fitting information fitted into a frame of the frame information by a fitting step with the fitting information designated by a designation step for the fitting information, and wherein the rendering step includes displaying the output image generated in said generation step on a display screen of a display device.

13. The method according to claim 12, wherein the selection step includes a step of selecting the image from the output images in the first size held by said holding step.

14. The method according to claim 12, further comprising an output step of outputting rendering information in the rendering step to an output device that permanently visually displays the rendering information in units of pages.

15. The method according to claim 12, wherein after fitting in the fitting step, a rendering size of the frame information of the image selected in the selection step is allowed to change, and when the rendering size of the frame information is changed after fitting, a fitting position of the fitting information is changed in correspondence with movement of the rendering position determined in the determination step to hold a fitting positional relationship with the frame information.

16. The method according to claim 15, wherein when the fitting information designated in the designation step is image information, the fitting step includes the step of inhibiting the fitting information from changing irrespective of the change in size of the frame information of the image selected in the selection step, and rendering an image in the fitting information, which corresponds to an interior of a frame of the frame information, as the fitting information in the frame.

17. The method according to claim 12, wherein a moving amount of a rendering position of the output image corresponding to the ratio of change in output position of the output image between the first and second sizes is compressed in the vicinity of an edge portion of an outputtable range so as to prevent the rendering position from falling outside the outputtable range of an output device upon movement of the rendering position determined in the determination step for the output image selected in the selection step.

18. An image processing method of an image processing apparatus for variable magnification processing of output information, comprising:
 a holding step of holding output images in a first size and an output position thereof, and holding output images in a second size and an output position thereof, wherein each of said output images is expressed by a plurality objects, and each of said objects is assigned rendering attributes corresponding to a size and an output position;
 a selection step of selecting a desired image from the output images held in said holding step, and designating an output size of the selected image;
 a generation step of generating each output image independently for each of said plurality of objects expressing the image selected in said selection step corresponding to the output size on the basis of a ratio of change in output image size between the first and second sizes defined by the rendering attributes of each of said plurality of objects held in said holding step compared to the output size of the image selected in the selection step;

a determination step of determining each rendering position independently of the output images for each of said plurality of objects expressing the image selected in said selection step corresponding to the output position on the basis of a ratio of change in output position between the first and second positions defined by the rendering attributes of each of said plurality of objects held in said holding step compared to the image selected in the selection step; and a rendering step of rendering each output image used for visualization, the output images rendered independently for each of said plurality of objects expressing the image selected in said selection step generated in the generation step at the rendering position determined in the determination step, wherein the rendered output image includes frame information of image information, the frame information including fitting information fitted into a frame of the frame information by a fitting step with the fitting information designated by a designation step for the fitting information, and wherein the rendering step includes a step of further rendering the output image generated in the generation step as print information to a printing apparatus that prints the output image using the print information.

19. The method according to claim 18, wherein after fitting in the fitting step, a rendering size of the frame information of the image selected in the selection step is allowed to change, and when the rendering size of the frame information is changed after fitting, a fitting position of the fitting information is changed in correspondence with movement of the rendering position determined in the determination step to hold a fitting positional relationship with the frame information.

20. The method according to claim 19, wherein when the fitting information designated in the designation step is image information, the fitting step includes the step of inhibiting the fitting information from changing irrespective of the change in size of the frame information of the image selected in the selection step, and rendering an image in the fitting information, which corresponds to an interior of a frame of the frame information, as the fitting information in the frame.

21. The method according to claim 18, wherein a moving amount of a rendering position of the output image corresponding to the ratio of change in output position of the output image between the first and second sizes is compressed in the vicinity of an edge portion of an outputtable range so as to prevent the rendering position from falling outside the outputtable range of an output device upon movement of the rendering position determined in the determination step for the output image selected in the selection step.

22. A computer-readable memory that stores a computer-executable program code for execution by a computer of image processing for an image processing apparatus capable of variable magnification processing of output information, comprising:

a program code of a holding step of holding output images in a first size and an output position thereof, and holding output images in a second size and an output position thereof, wherein each of said output images is expressed by a plurality objects, and each of said objects is assigned rendering attributes corresponding to a size and an output position;

a program code of a selection step of selecting a desired image from the output images held in said holding step, and designating an output size of the selected image;

a program code of a generation step of generating each output image independently for each of said plurality of objects expressing the image selected in said selection step corresponding to the output size on the basis of a ratio of change in output image size between the first and second sizes defined by the rendering attributes of each of said plurality of objects held in said holding step compared to the output sizes of the image selected in the selection step;

a program code of a determination step of determining each rendering position independently of the output images for each of said plurality of objects expressing the image selected in said selection step corresponding to the output position on the basis of a ratio of change in output position between the first and second positions defined by the rendering attributes of each of said plurality of objects held in said holding step compared to the image selected in the selection step; and a program code of a rendering step of rendering each output images independently for each of said plurality of objects expressing the image selected in said selection step generated in the generation step at the rendering position determined in the determination step, wherein the rendered output image includes frame information of image information, the frame information including fitting information fitted into a frame of the frame information by a fitting step with the fitting information designated by a designation step for the fitting information, and wherein the rendering step displays the output image generated by said generation step on a display screen of a display device.

23. A computer-readable memory that stores a computer-executable program code for execution by a computer of image processing for an image processing apparatus capable of variable magnification processing of output information, comprising:

a program code of a holding step of holding output images in a first size and an output position thereof, and holding output images in a second size and an output position thereof, wherein each of said output images is expressed by a plurality objects, and each of said objects is assigned rendering attributes corresponding to a size and an output position;

a program code of a selection step of selecting a desired image from the output images held in said holding step, and designating an output size of the selected image;

a program code of a generation step of generating each output image independently for each of said plurality of objects expressing the image selected in said selection step corresponding to the output size on the basis of a ratio of change in output image size between the first and second sizes defined by the rendering attributes of each of said plurality of objects held in said holding step compared to the output sizes of the image selected in the selection step;

a program code of a determination step of determining each rendering position independently of the output images for each of said plurality of objects expressing the image selected in said selection step corresponding to the output position on the basis of a ratio of change in output position between the first and second positions defined by the rendering attributes of each of said plurality of objects held in said holding step compared to the image selected in the selection step; and a program code of a rendering step of rendering each output image independently for each of said plurality of objects expressing the image selected in said selection step generated in the generation step at the rendering position determined in the determination step, wherein the rendered output image includes frame information of image information, the frame information including fitting information fitted into a frame of the frame information by a fitting step with the fitting information designated by a designation step for the fitting information, and wherein the rendering step includes a step of further rendering the output image generated in the generation step as print information to a printing apparatus that prints the output image using the print information.

\* \* \* \* \*

UNITED STATES PATENT AND TRADEMARK OFFICE
CERTIFICATE OF CORRECTION

PATENT NO. : 7,295,221 B2
APPLICATION NO. : 09/176274
DATED : November 13, 2007
INVENTOR(S) : Ohshima et al.

It is certified that error appears in the above-identified patent and that said Letters Patent is hereby corrected as shown below:

<u>COLUMN 1:</u>
       Line 10, "image processing" should read -- image-processing --;
       Line 57, "image processing" should read -- image-processing --; and
       Line 66, "image processing" should read -- image-processing--.

<u>COLUMN 2:</u>
       Line 7, "image processing" should read -- image-processing --.

<u>COLUMN 3:</u>
       Line 13, "image processing" should read -- image-processing --;
       Line 15, "image processing" should read -- image-processing --;
       Line 17, "objects," should read -- object, --; and
       Line 39, "image processing" should read -- image-processing --.

<u>COLUMN 4:</u>
       Line 43, "photof-" should read -- photo- --; and
       Line 44, "rame" should read -- frame --.

<u>COLUMN 11:</u>
       Line 39, "photof-" should read -- photo- --; and
       Line 40, "rame" should read -- frame --.

<u>COLUMN 12:</u>
       Line 14, "photof-" should read -- photo- --;
       Line 15, "rames" should read -- frames --; and
       Line 51, "characters are" should read -- character is --.

<u>COLUMN 14:</u>
       Line 51, "photof-" should read -- photo- --; and
       Line 52, "rame." should read -- frame. --.

<u>COLUMN 20:</u>
       Line 54, "plurality" should read -- plurality of --.

<u>COLUMN 21:</u>
       Line 65, "plurality" should read -- plurality of --.

UNITED STATES PATENT AND TRADEMARK OFFICE
CERTIFICATE OF CORRECTION

PATENT NO. : 7,295,221 B2
APPLICATION NO. : 09/176274
DATED : November 13, 2007
INVENTOR(S) : Ohshima et al.

It is certified that error appears in the above-identified patent and that said Letters Patent is hereby corrected as shown below:

<u>Column 22:</u>
      Line 23, "images" should read -- image --; and
      Line 44, "plurality" should read -- plurality of --.

Signed and Sealed this

Twelfth Day of August, 2008

JON W. DUDAS
*Director of the United States Patent and Trademark Office*